United States Patent
Hara

(10) Patent No.: US 8,089,533 B2
(45) Date of Patent: Jan. 3, 2012

(54) FIXED PATTERN NOISE REMOVAL CIRCUIT, FIXED PATTERN NOISE REMOVAL METHOD, PROGRAM, AND IMAGE PICKUP APPARATUS

(75) Inventor: Manabu Hara, Kanagawa (JP)

(73) Assignee: Sony Corporation (JP)

( * ) Notice: Subject to any disclaimer, the term of this patent is extended or adjusted under 35 U.S.C. 154(b) by 836 days.

(21) Appl. No.: 12/077,149

(22) Filed: Mar. 17, 2008

(65) Prior Publication Data

US 2008/0239110 A1 Oct. 2, 2008

(30) Foreign Application Priority Data

Mar. 28, 2007 (JP) .................................. P2007-083536

(51) Int. Cl.
*H04N 5/217* (2011.01)
(52) U.S. Cl. .......................................... 348/241
(58) Field of Classification Search ............... 348/222.1, 348/241–251
See application file for complete search history.

(56) References Cited

U.S. PATENT DOCUMENTS

| 6,831,686 | B1 | 12/2004 | Koren et al. | |
|---|---|---|---|---|
| 7,035,475 | B1* | 4/2006 | Chen et al. | 382/254 |
| 7,283,163 | B1* | 10/2007 | Noda | 348/243 |
| 7,625,708 | B1* | 12/2009 | Sekowski et al. | 435/7.1 |
| 2005/0068431 | A1* | 3/2005 | Mori | 348/241 |
| 2005/0117035 | A1* | 6/2005 | Hofflinger et al. | 348/241 |
| 2006/0007504 | A1* | 1/2006 | Inaba et al. | 358/463 |
| 2006/0007507 | A1* | 1/2006 | Inaba et al. | 358/474 |
| 2006/0082675 | A1* | 4/2006 | McGarvey et al. | 348/362 |
| 2006/0092287 | A1 | 5/2006 | Hara et al. | |

FOREIGN PATENT DOCUMENTS

| JP | 07072256 A | 3/1995 |
|---|---|---|
| JP | 10322598 A | 12/1998 |
| JP | 2000138867 A | 5/2000 |
| JP | 2000-295533 A | 10/2000 |
| JP | 2002-526992 A | 8/2002 |
| JP | 2006074190 A | 3/2006 |
| JP | 2006-135423 A | 5/2006 |
| JP | 2006135424 A | 5/2006 |

OTHER PUBLICATIONS

Office Action from Japanese Application No. 2009-025646, dated Jul. 19, 2011.

* cited by examiner

*Primary Examiner* — Nhan T Tran
*Assistant Examiner* — Tuan Le
(74) *Attorney, Agent, or Firm* — Lerner, David, Littenberg, Krumholz & Mentlik, LLP

(57) ABSTRACT

A fixed pattern noise removal circuit is provided for removing vertical streak fixed pattern noise from an output signal of an image sensor including an output system for every predetermined number of columns. The fixed pattern noise removal circuit includes a correction signal output unit configured to output a correction signal corresponding to the output system in accordance with an offset component and a light-intensity-dependent component of the fixed pattern noise occurring in the output system, and a signal correction unit configured to remove the fixed pattern noise from the output signal of the image sensor on the basis of the correction signal output from the correction signal output unit.

4 Claims, 16 Drawing Sheets

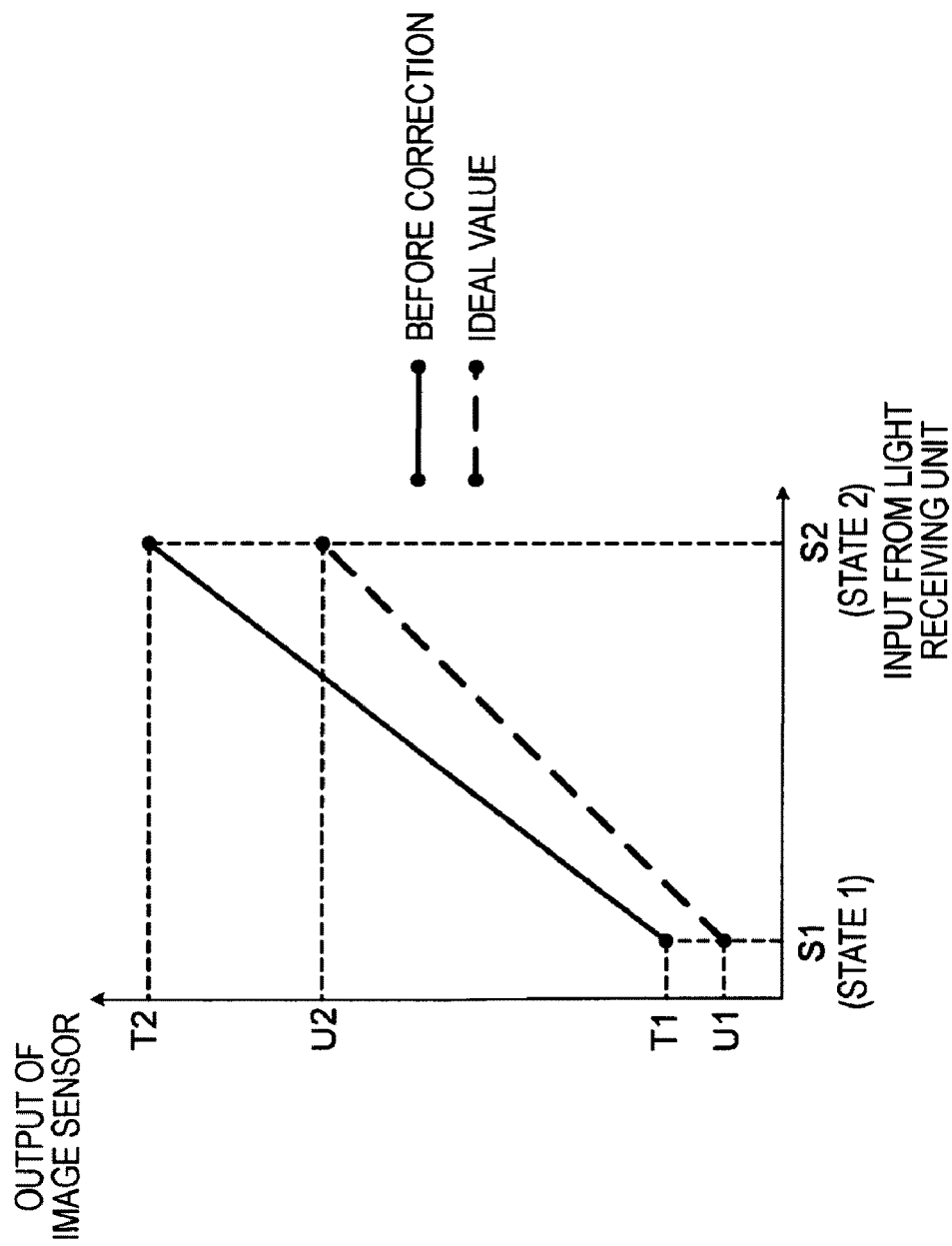

FIXED PATTERN NOISE REMOVAL CIRCUIT, FIXED PATTERN NOISE REMOVAL METHOD, PROGRAM, AND IMAGE PICKUP APPARATUS

CROSS REFERENCES TO RELATED APPLICATIONS

The present application claims priority from Japanese Patent Application No. JP 2007-083536 filed in the Japanese Patent Office on Mar. 28, 2007, the entire content of which is incorporated herein by reference.

BACKGROUND OF THE INVENTION

1. Field of the Invention

The present invention relates to a fixed pattern noise removal circuit, a fixed pattern noise removal method, a program, and an image pickup apparatus suitably used for an image pickup apparatus including a complementary metal oxide semiconductor (CMOS) image sensor.

In particular, the present invention relates to a fixed pattern noise removal circuit, a fixed pattern noise removal method, a program, and an image pickup apparatus that remove vertical streak fixed pattern noise from an output signal of an image sensor having an output system for each of a predetermined number of columns. The fixed pattern noise removal circuit effectively removes vertical streak fixed pattern noise by removing fixed pattern noise from an output signal of an image sensor on the basis of a correction signal corresponding to a light-intensity-dependent component as well as an offset component of fixed pattern noise generated by the output system.

2. Description of the Related Art

Solid-state image pickup apparatuses including a CMOS image sensor are well known. A CMOS image sensor is an image pickup element having a photoelectric transducer and a readout circuit disposed on each of pixels thereof. The pixels are randomly accessed, and signals can be read out from the pixels at high speed. In addition, since the CMOS image sensor is produced using a CMOS process, a signal processing circuit including an amplifier and an A/D converter can be easily integrated into one.

One type of CMOS image sensor is a column-based CMOS image sensor that has an output system (a column signal processing circuit), such as an amplifier and an A/D converter, for each of pixels thereof. In a column-based CMOS image sensor, although the pixels are uniformly exposed to light, the outputs of the pixels are non-uniform from column to column due to the variation in the processing properties of the output systems of the columns. Accordingly, column-based CMOS image sensors exhibit vertical streak fixed pattern noise, thereby degrading the quality of an image.

For example, Japanese Unexamined Patent Application Publication No. 2006-135423 describes technology for removing or reducing such vertical streak fixed pattern noise.

SUMMARY OF THE INVENTION

In the technology described in Japanese Unexamined Patent Application Publication No. 2006-135423, vertical streak fixed pattern noise is removed by subtracting a correction signal corresponding to an offset component from an output signal of an image sensor. However, vertical streak fixed pattern noise includes not only the offset component but also a light-intensity-dependent component that varies in accordance with the incident light intensity. Accordingly, in the technology described in Japanese Unexamined Patent Application Publication No. 2006-135423, even if vertical streak fixed pattern noise can be accurately removed when the image sensor is shielded from light, vertical streak fixed pattern noise may appear again due to the presence of the light-intensity-dependent component when the image sensor is exposed to light.

Accordingly, the present invention provides technology for effectively removing vertical streak fixed pattern noise from an output signal of an image sensor.

According to an embodiment of the present invention, a fixed pattern noise removal circuit is provided for removing vertical streak fixed pattern noise from an output signal of an image sensor including an output system for every predetermined number of columns. The fixed pattern noise removal circuit includes a correction signal output unit configured to output a correction signal corresponding to the output system in accordance with an offset component and a light-intensity-dependent component of the fixed pattern noise occurring in the output system and a signal correction unit configured to remove the fixed pattern noise from the output signal of the image sensor on the basis of the correction signal output from the correction signal output unit.

The image sensor includes an output system (e.g., a signal processing circuit including an amplifier and an A/D converter) for every predetermined number of columns. In this case, an output system may be provided for each of the columns or may be provided for every plurality of the columns. The correction signal output unit outputs a correction signal associated with the output signal of the image sensor, that is, a correction signal corresponding to the output system that outputs the output signal.

The correction signal corresponds to not only an offset component but also a light-intensity-dependent component of the fixed pattern noise occurring in the output system. The signal correction unit removes fixed pattern noise from the output signal of the image sensor on the basis of the correction signal output from the correction signal output unit. The correction signal corresponding to the offset component and the light-intensity-dependent component of the fixed pattern noise occurring in the output system can be computed by measuring the output signals during a light-shielded period and during a light exposure period of the predetermined output system and using the measured values and ideal values.

For example, the correction signal output unit can output a first correction signal corresponding to the offset component and a second correction signal corresponding to the light-intensity-dependent component, and the signal correction unit can include a subtracter for subtracting a black level from the output signal of the image sensor, a first adder for adding the first correction signal to an output signal of the subtracter, a multiplier for multiplying an output signal of the first adder by the second correction signal, and a second adder for adding the black level to an output signal of the multiplier. By subtracting the black level from the output signal of the image sensor, performing computation using the first and second correction signals so as to remove the fixed pattern noise, and adding the black level back to the output signal, the fixed pattern noise can be removed without being influenced by the black level.

In addition, the correction signal output unit can output a first correction signal corresponding to the offset component and a second correction signal corresponding to the light-intensity-dependent component, and the signal correction unit can include a subtracter configured to subtract a black level from the output signal of the image sensor, a first adder configured to add the first correction signal to an output signal of the subtracter, a multiplier configured to multiply an output signal of the first adder by the second correction signal, and a second adder configured to add the black level to an output signal of the multiplier. In this way, by subtracting the black level from the output signal of the image sensor, performing computation using the first and second correction signals so as to remove the fixed pattern noise, and adding the black level back to the output signal, the fixed pattern noise can be removed without being influenced by the black level.

The correction signal output unit can include a memory configured to store the correction signals corresponding to the output systems and a memory control unit configured to read out, from the memory, the correction signal corresponding to the output system that outputs an output signal of the image sensor on the basis of a synchronization signal that is synchronized with the output signal of the image sensor. Such a configuration in which the correction signal is read out from the memory and is output can simplify the correction signal output unit.

The correction signal output unit can include a plurality of registers configured to output the correction signals corresponding to the output systems, a selector configured to selectively retrieve a predetermined correction signal from among the correction signals output from the registers, a memory configured to store an output selection signal corresponding to each of the output systems, and a memory control unit configured to read out, from the memory, an output selection signal corresponding to the output system that outputs an output signal of the image sensor on the basis of the synchronization signal that is synchronized with the output signal of the image sensor. The selector can selectively retrieve the predetermined correction signal from among the correction signals output from the registers on the basis of the output selection signal read out from the memory. In such a case, since the memory stores the output selection signal that has a bit length smaller than that of the correction signal, the memory capacity can be reduced. As described above, a fixed pattern noise removal circuit having a plurality of registers that output the correction signal corresponding to each of the output systems is advantageous when the number of the output systems disposed in parallel is small.

The correction signal output unit can include a plurality of registers configured to output the correction signals corresponding to the output systems, a selector configured to selectively retrieve a predetermined correction signal from among the correction signals output from the registers, and a counter configured to perform a counting operation on the basis of a synchronization signal that is synchronized with the output signal of the image sensor, and the selector can selectively retrieve the predetermined correction signal from among the correction signals output from the registers on the basis of a count value in the counter. In such a case, the need for a memory can be eliminated. The fixed pattern noise removal circuit having a plurality of registers that output the correction signal corresponding to each of the output systems is advantageous when the number of the output systems disposed in parallel is small.

As described above, fixed pattern noise is removed from an output signal of the image sensor on the basis of a correction signal corresponding to not only the offset component but also the light-intensity-dependent component of the fixed pattern noise occurring in the output signal. Accordingly, vertical streak fixed pattern noise can be effectively removed.

The fixed pattern noise removal circuit can further includes a correction coefficient output unit configured to output a correction coefficient for correcting the gain of the correction signal and a gain correction unit configured to multiply the correction signal output from the correction signal output unit by the correction coefficient output from the correction coefficient output unit. The fixed pattern noise removal circuit that corrects the gain by multiplying the correction signal by the correction coefficient can compensate for a change in fixed pattern noise caused by a variation in the property of the output system due to a temperature change, a variation in the gain of an amplifier included in the output system, and a variation in the operation of an image sensor due to the selection of an interlace driving method or a progressive driving method.

The correction coefficient output unit can output the correction coefficient corresponding to the output system that outputs the output signal of the image sensor. In such a configuration, the different optimal correction coefficients can be used for each of the output systems, and therefore, the gain of the correction signal can be optimally corrected.

The correction coefficient output unit can include a memory configured to store the correction coefficient corresponding to each of the output systems and a memory control unit configured to read out, from the memory, the correction coefficient corresponding to the output system that outputs an output signal of the image sensor on the basis of a synchronization signal that is synchronized with the output signal of the image sensor. Such a configuration in which the correction signal is read out from the memory and is output can simplify the correction coefficient output unit.

The correction coefficient output unit can include a plurality of registers configured to output the correction coefficients corresponding to the output systems, a selector configured to selectively retrieve a predetermined correction coefficient from among the correction coefficients output from the registers, a memory configured to store an output selection signal corresponding to each of the output systems, and a memory control unit configured to read out, from the memory, the output selection signal corresponding to the output system that outputs an output signal of the image sensor on the basis of a synchronization signal that is synchronized with the output signal of the image sensor, and the selector can selectively retrieve the predetermined correction coefficient from among the correction coefficients output from the registers on the basis of the selection signal read out from the memory. In such a configuration, since the memory stores the output selection signal that has a bit length smaller than that of the correction coefficient, the memory capacity can be reduced. As described above, a fixed pattern noise removal circuit having a plurality of registers that output the correction coefficient corresponding to each of the output systems is advantageous when the number of the output systems disposed in parallel is small.

According to the above-described embodiments, a fixed pattern noise removal circuit, a fixed pattern noise removal method, a program, and an image pickup apparatus can be provided that remove vertical streak fixed pattern noise from an output signal of an image sensor having an output system for each of a predetermined number of columns. The fixed pattern noise removal circuit, the fixed pattern noise removal method, the program, and the image pickup apparatus can effectively remove vertical streak fixed pattern noise by removing fixed pattern noise from an output signal of an image sensor on the basis of a correction signal corresponding to a light-intensity-dependent component as well as an offset component of fixed pattern noise generated by the output system.

BRIEF DESCRIPTION OF THE DRAWINGS

FIG. 6 is a diagram illustrating example computation of a correction signal corresponding to an offset component and a light-intensity-dependent component used in a vertical streak fixed pattern noise removal circuit;

DESCRIPTION OF THE PREFERRED EMBODIMENTS

Figure 1:
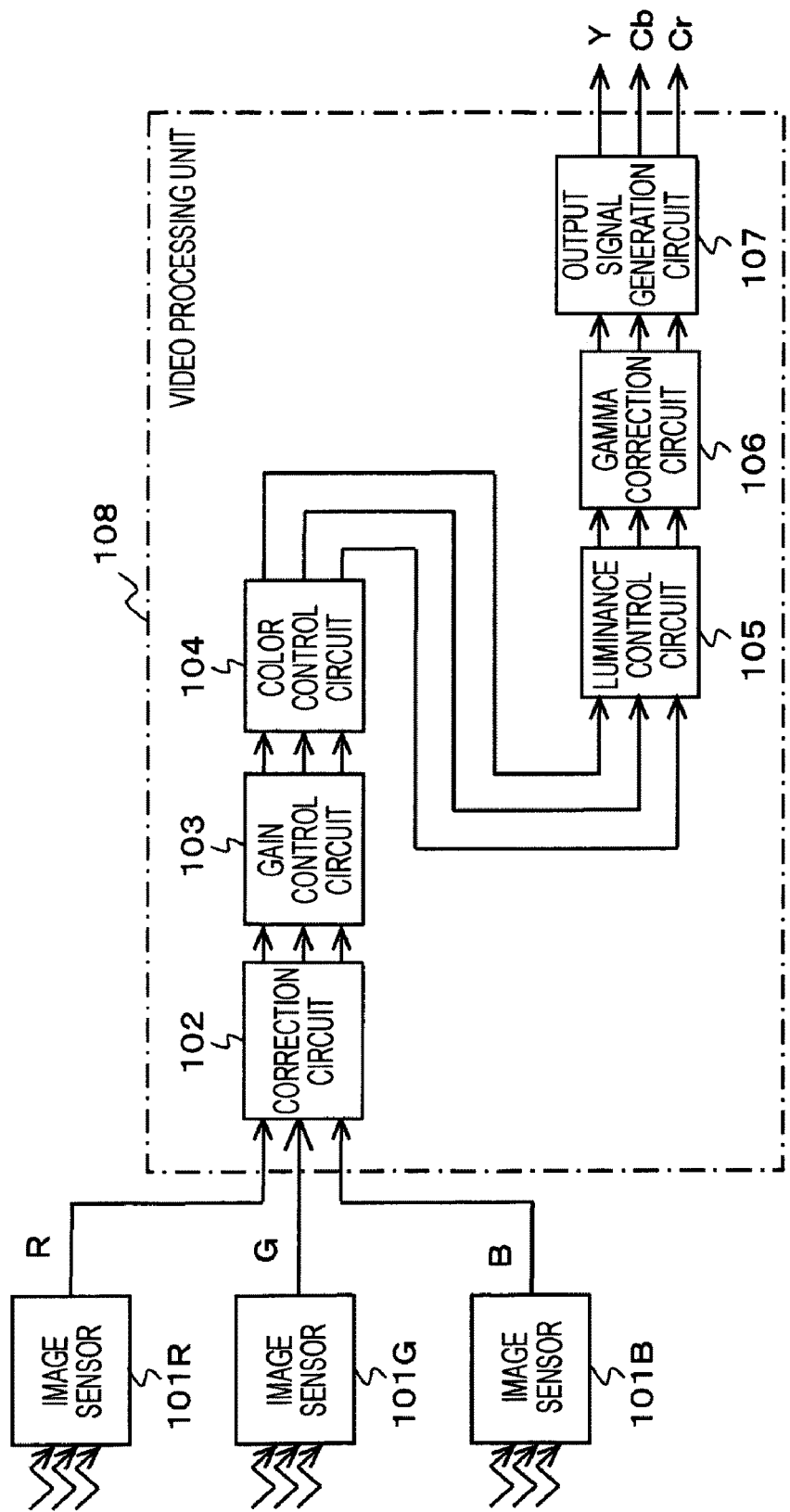
FIG. 1 is a block diagram of an image pickup apparatus according to an embodiment of the present invention.

Exemplary embodiments of the present invention are described below with reference to the accompanying drawings. FIG. 1 illustrates an exemplary configuration of an image pickup apparatus 100 according to an embodiment of the present invention. The image pickup apparatus 100 is a three-panel color image pickup apparatus. The image pickup apparatus 100 includes CMOS image sensors 101R, 101G, and 101B, a correction circuit 102, a gain control circuit 103, a color control circuit 104, a luminance control circuit 105, a gamma correction circuit 106, and an output signal generation circuit 107. The correction circuit 102, the gain control circuit 103, the color control circuit 104, the luminance con-trol circuit 105, the gamma correction circuit 106, and the output signal generation circuit 107 form a video processing unit 108.

The CMOS image sensors 101R, 101G, and 101B are image sensors for red, green, and blue color images, respectively. Each of the CMOS image sensors 101R, 101G, and 101B is a column-based CMOS image sensor having an output system (a column signal processing circuit), such as an amplifier and an A/D converter, for each column.

Figure 2:
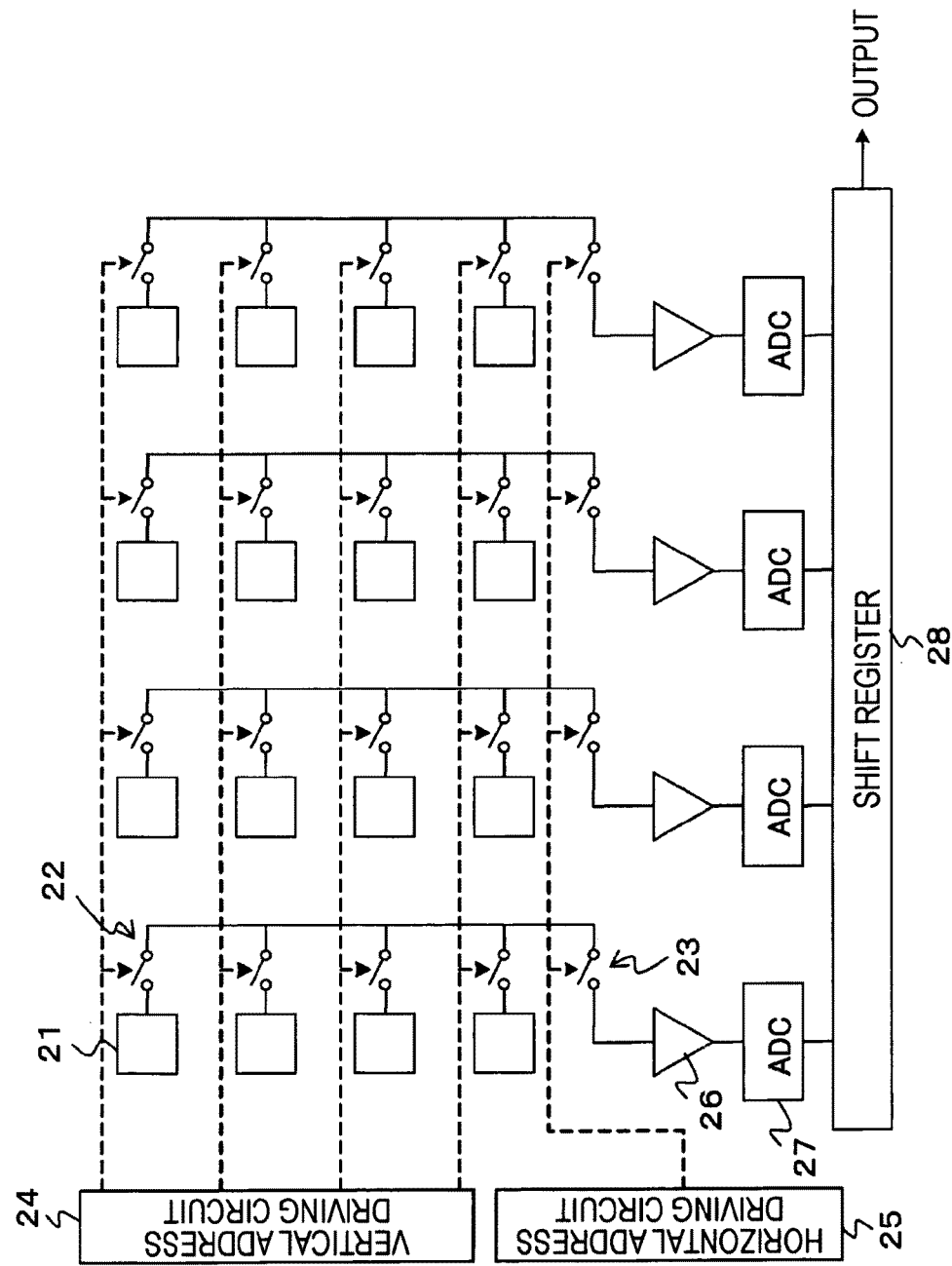
FIG. 2 illustrates an example configuration of a column-based CMOS image sensor in which an output system is provided to each of columns.

FIG. 2 illustrates an example configuration of an image sensor 101 (the CMOS image sensor 101R, 101G, or 101B). The image sensor 101 includes pixels (light receiving units) 21 arranged in a matrix, a vertical line selector 22 and a horizontal line selector 23 for selecting one of the pixels 21, a vertical address driving circuit 24 for driving the vertical line selector 22, a horizontal address driving circuit 25 for driving the horizontal line selector 23, a column amplifier 26, an A/D converter (ADC) 27, and a shift register 28. The column amplifier 26 and the A/D converter 27 are provided for each column so as to function as an output system (a column signal processing circuit) for each column.

Subject light made incident on the image sensor 101 is photoelectrically converted by the light receiving units 21. The result (a voltage signal) of the photoelectrical conversion performed by each of the light receiving units 21 is sequentially selected by the vertical line selector 22 and the horizontal line selector 23. Thereafter, the selected signal is supplied to the shift register 28 via the column amplifier 26 and the A/D converter 27 and is output in synchronization with a clock. At that time, the column amplifier 26 amplifies the result of the photoelectrical conversion to an appropriate level. The A/D converter 27 converts the output signal of the column amplifier 26 from an analog format to a digital format.

For simplicity, the example configuration of the image sensor 101 in FIG. 2 includes pixels arranged in rows of only four and in columns of only four. However, in practice, a CMOS sensor for a high-definition standard includes effective pixels arranged in columns of 1920 and in rows of 1080, for example.

Referring back to FIG. 1, the correction circuit 102 performs pixel defect correction and shading correction on red color data R, green color data G, and blue color data B output from the CMOS image sensors 101R, 101G, and 101B, respectively. In addition, the correction circuit 102 removes vertical streak fixed pattern noise. The operation for removing vertical streak fixed pattern noise is described in more detail below.

The gain control circuit 103 controls the gains of the color data for all colors acquired by the correction circuit 102 so as to adjust the white balance. The color control circuit 104 controls the gains of the color data for all colors output from the gain control circuit 103 so as to darken or lighten a particular color. The luminance control circuit 105 performs luminance compression on the color data for all colors output from the color control circuit 104 in order to limit the level of a video signal to a predetermined range.

The gamma correction circuit 106 performs gamma correction on the color data for all colors output from the luminance control circuit 105 so that the color data is adjusted to the monitor gamma of, for example, a cathode ray tube (CRT). The output signal generation circuit 107 converts the red color data, green color data, and blue color data to a final video output format. For example, the output signal generation circuit 107 includes a matrix circuit. The output signal generation circuit 107 converts the red color data, green color data, and blue color data to a format including a luminance signal Y, a red difference signal Cr, and a blue difference signal Cb.

An exemplary operation of the image pickup apparatus 100 shown in FIG. 1 is briefly described next. Red light, green light, and blue light emitted from a subject are acquired by an optical system (not shown). The red light, green light, and blue light are made incident on the imaging surfaces of the CMOS image sensors 101R, 101G, and 101B, respectively. Thus, a red image, a green image, and a blue image are formed on the imaging surfaces. After the color images are formed on the imaging surfaces, as described above, the CMOS image sensors 101R, 101G, and 101B perform an image capturing operation. In this way, the data for red, green, and blue colors associated with the subject can be obtained.

The correction circuit 102, the gain control circuit 103, and the color control circuit 104 of the video processing unit 108 perform a correcting operation (e.g., a removal operation of vertical streak fixed pattern noise, defect correction, and shading correction operation) and a control operation (e.g., white balance control and color control) on the red, green, and blue color data R, G, B acquired by the image sensors 101R, 101G, and 101B. In addition, the luminance control circuit 105 and the gamma correction circuit 106 of the video processing unit 108 perform luminance compression and gamma correction on the color data for all colors output from the color control circuit 104. Subsequently, the color data for all colors output from the gamma correction circuit 106 are supplied to the output signal generation circuit 107, which converts the color data to final video signal output format (Y, Cr, Cb).

As noted above, the correction circuit 102 includes the fixed pattern noise removal circuit for removing vertical streak fixed pattern noise. The fixed pattern noise removal circuit may be included in a circuit downstream of the gain control circuit 103. However, the fixed pattern noise removal circuit can be optimally disposed in the correction circuit 102. This is because vertical streak fixed pattern noise is generated in the image sensor 101 (the CMOS image sensors 101R, 101G, and 101B) and needs to be removed before the levels of the color data are changed by the gain control circuit 103. Note that the fixed pattern noise removal circuit is provided to each of the signal processing systems for red, green, and blue colors.

The fixed pattern noise removal circuit is described below. Vertical streak fixed pattern noise is described first.

Vertical streak fixed pattern noise occurs since the output levels of columns of the image sensor 101 (refer to FIG. 2) are different even when all the pixels are uniformly exposed. This difference is caused by variation in the processing properties of the output systems (the column signal processing circuit), such as the column amplifier 26 and the A/D converter 27 for each column of the CMOS image sensor 101.

Figure 3:
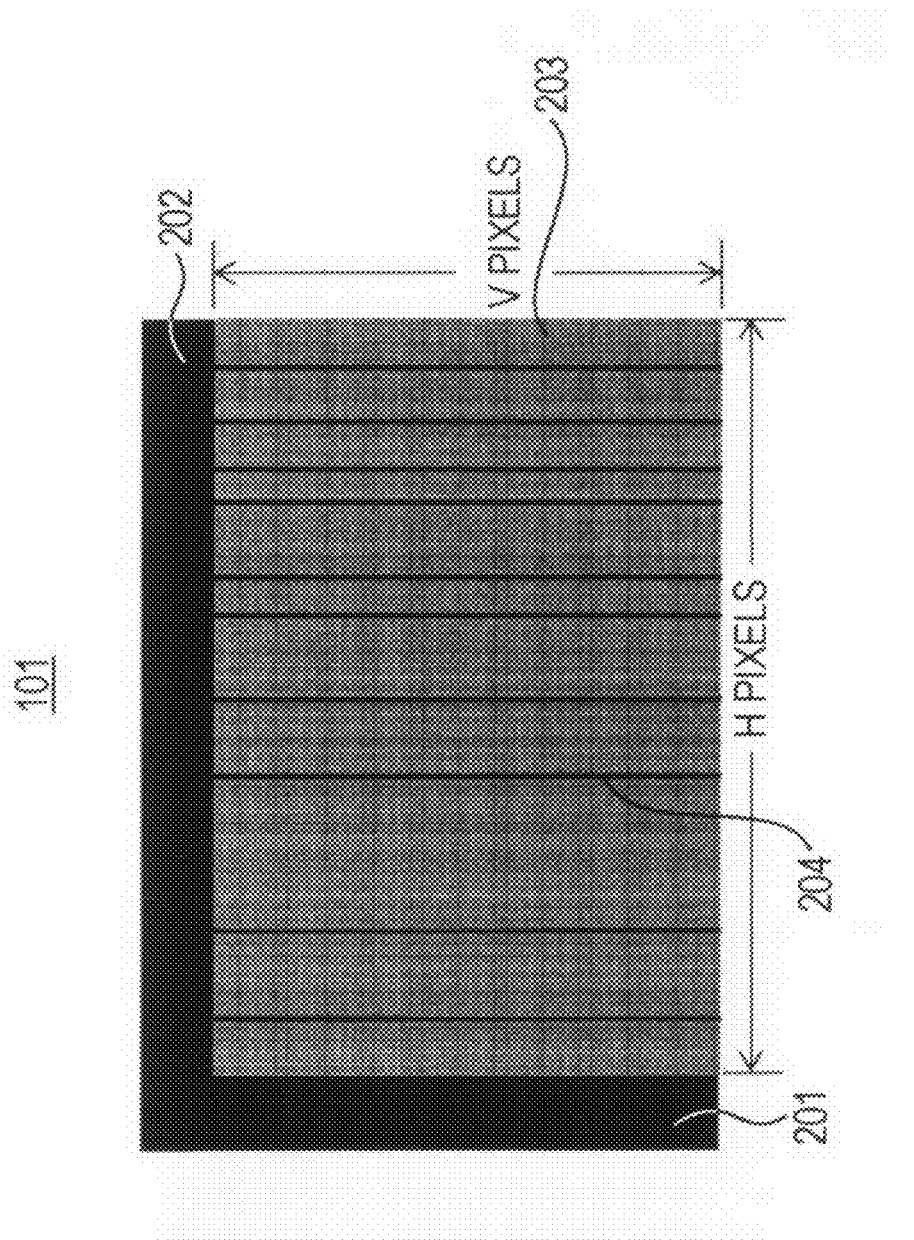
FIG. 3 is a schematic illustration of the configuration of the column-based CMOS image sensor and generated vertical streaks (vertical streak fixed pattern noise)

FIG. 3 is a schematic illustration of an exemplary configuration of the column-based CMOS image sensor 101 and generated vertical streaks (vertical streak fixed pattern noise). The image sensor 101 includes an effective pixel region 203 having a size of H pixels by V pixels in the horizontal direction and the vertical direction, respectively. The image sensor 101 further includes a horizontal optical black region (HOPB) 201 and a vertical optical black region (VOPB) 202. In the image sensor 101 having such a configuration, if, as described above, variation in the processing properties of the output systems (the column signal processing circuit) is present, the output levels of columns of the image sensor 101 are different even when all the pixels are uniformly exposed. Therefore, a vertical streak 204 occurs.

Vertical streak fixed pattern noise (hereinafter also referred to as "vertical streak noise") primarily includes an offset component and a light-intensity-dependent component.

Figure 4:
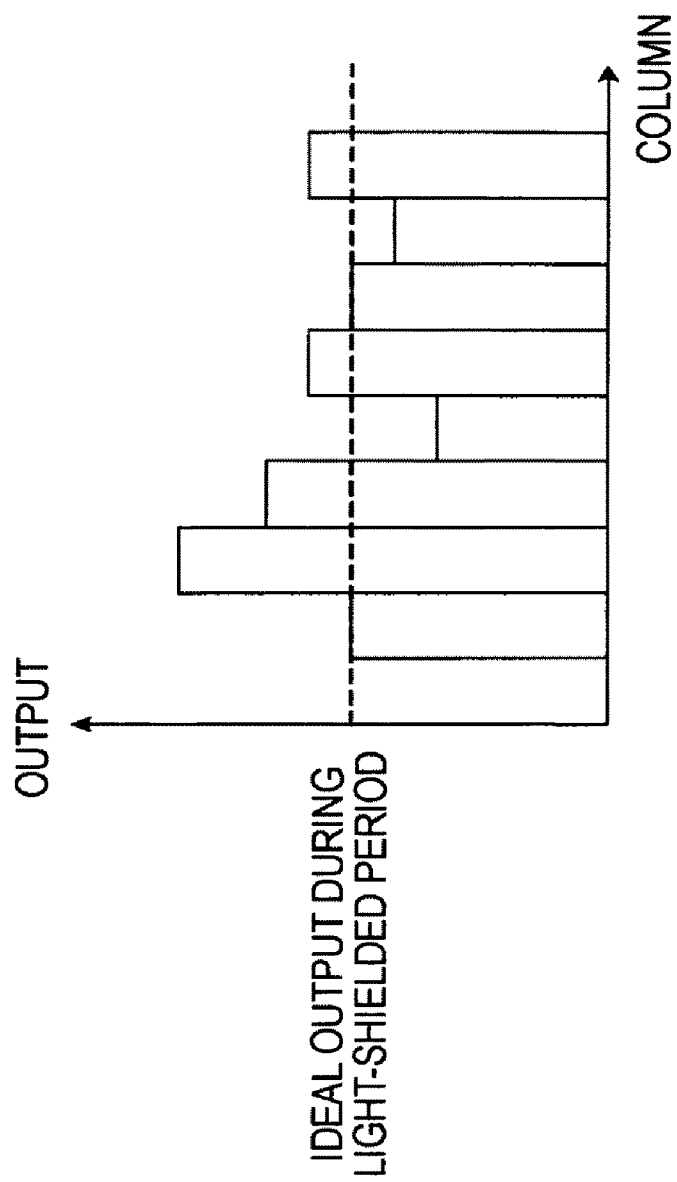
FIG. 4 is a diagram illustrating an offset component of vertical streak fixed pattern noise.

As shown in FIG. 4, the offset component of each column is a difference between the output of the column and an ideal output during a light-shielded period. In this case, the output of the column may be higher or lower than the ideal output. The offset component of each column is a constant value regardless of the intensity of the incident light.

Figure 5A:
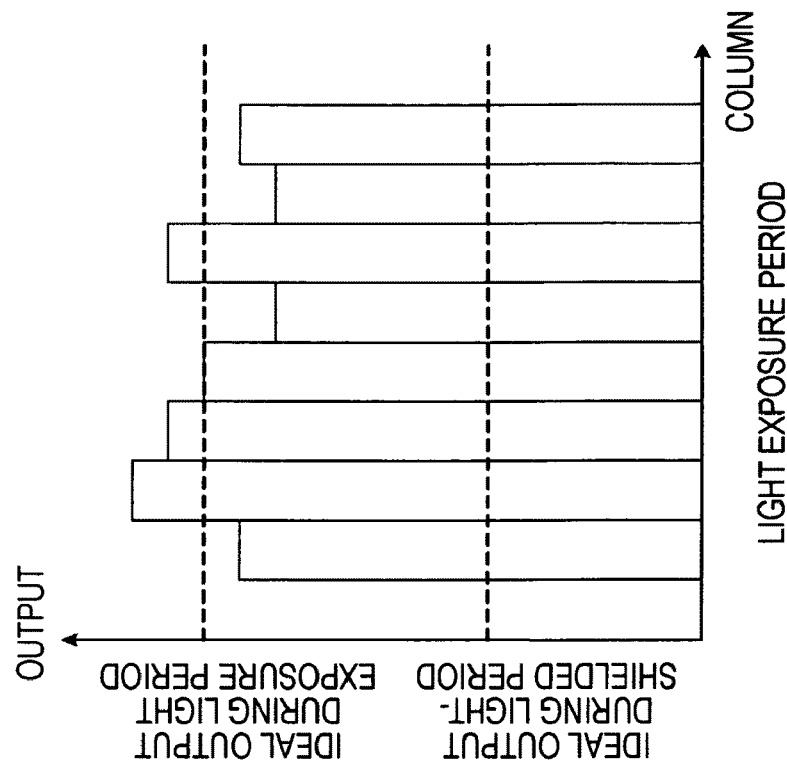
FIG. 5A and 5B are diagrams illustrating a light-intensity-dependent component of vertical streak fixed pattern noise.
Figure 5B:
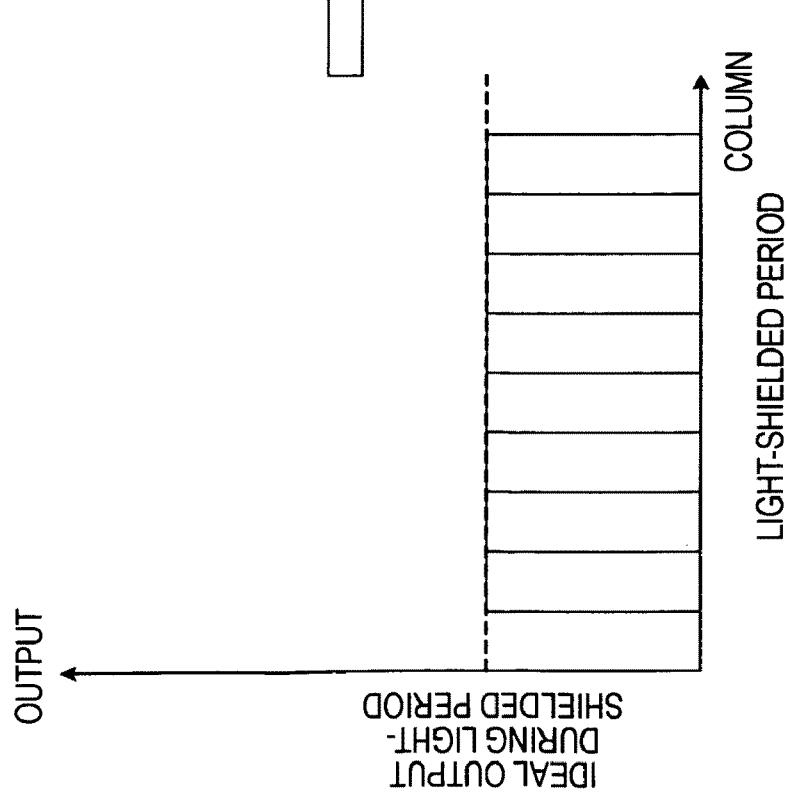

Furthermore, even when, as shown in FIG. 5A, the output of each column is ideal during a light-shielded period, the output may be offset from the ideal value during a light exposure period, as shown in FIG. 5B. The offset component of each column is defined as a difference between the output of the column and an ideal value during a light exposure period. The light-intensity-dependent component of each column varies in accordance with the intensity of incident light.

According to the present exemplary embodiment, the fixed pattern noise removal circuit obtains an output signal Y from an input signal X using one of the following equations:

$$Y(m, n) = A(m) * \{X(m, n) + B(m)\} \tag{1}$$

$$Y(m, n) = C(m) * X(m, n) + D(m) \tag{2}$$

where m denotes a column number, and n denotes a row number.

In equation (1), A(m) represents a correction signal (a second correction signal) corresponding to a light-intensity-dependent component. B(m) represents a correction signal (a first correction signal) corresponding to an offset component. In equation (2), C(m) represents a correction signal (a first correction signal) corresponding to a light-intensity-dependent component. D(m) represents a correction signal (a second correction signal) corresponding to an offset component and the light-intensity-dependent component.

For example, in equations (1) and (2), the correction signals A, B, C, and D are computed using the levels of the output signals during a light-shielded period and during a light exposure period as follows. As shown in FIG. 6, let S1 and S2 denote inputs from the light receiving unit 21 of the image sensor 101 during a light-shielded period (an S1 state) and during a light exposure period (an S2 state) with any light intensity, respectively. Let T1 and T2 denote the outputs of the image sensor 101 obtained after the inputs S1 and S2 pass through the output system (the signal processing circuit including the column amplifier 26 and the A/D converter 27), respectively. The outputs T1 and T2 contain vertical streak fixed pattern noise. Let U1 and U2 denote the ideal outputs for the inputs S1 and S2, respectively. Note that S1, S2, T1, and T2 are average values for any one of the columns.

Let x denote an ideal output that does not include vertical streak fixed pattern noise. Let y denote an output that includes vertical streak fixed pattern noise. Then, the relationship between x and y can be expressed as follows:

$$y = a*x + b \tag{3}$$

Since this line passes through two points (U1, T1) and (U2, T2), the following equations can be obtained:

$$T1 = a*U1 + b \tag{4}$$

$$T2 = a*U2 + b \tag{5}$$

From equations (4) and (5), a and b can be determined as follows:

$$a = (T1 - T2)/(U1 - U2) \tag{6}$$

$$b = \{(T1(U1 - U2) - U1(T1 - T2)\}/(U1 - U2) \tag{7}$$

Equations (1) and (2) can be used for changing the output y that includes vertical streak fixed pattern noise and that is represented by equation (3) to the ideal output x, and the following relationships are satisfied:

$$Y=A*(X+B)=x=(y-b)/a \quad (8)$$

$$Y=C*X+D=x=y/a-b/a \quad (9)$$

Therefore, the correction signals A, B, C, and D in equations (1) and (2) can be obtained as follows:

$$A=1/a=(U1-U2)/(T1-T2) \quad (10)$$

$$B=-b=-\{(T1(U1-U2)-U1(T1-T2)\}/(U1-U2) \quad (11)$$

$$C=1/a=(U1-U2)/(T1-T2) \quad (12)$$

$$D=-b/a=-\{(T1(U1-U2)-U1(T1-T2)\}*(U1-U2)/\{(U1-U2)*(T1-T2)\} \quad (13)$$

Figure 7:
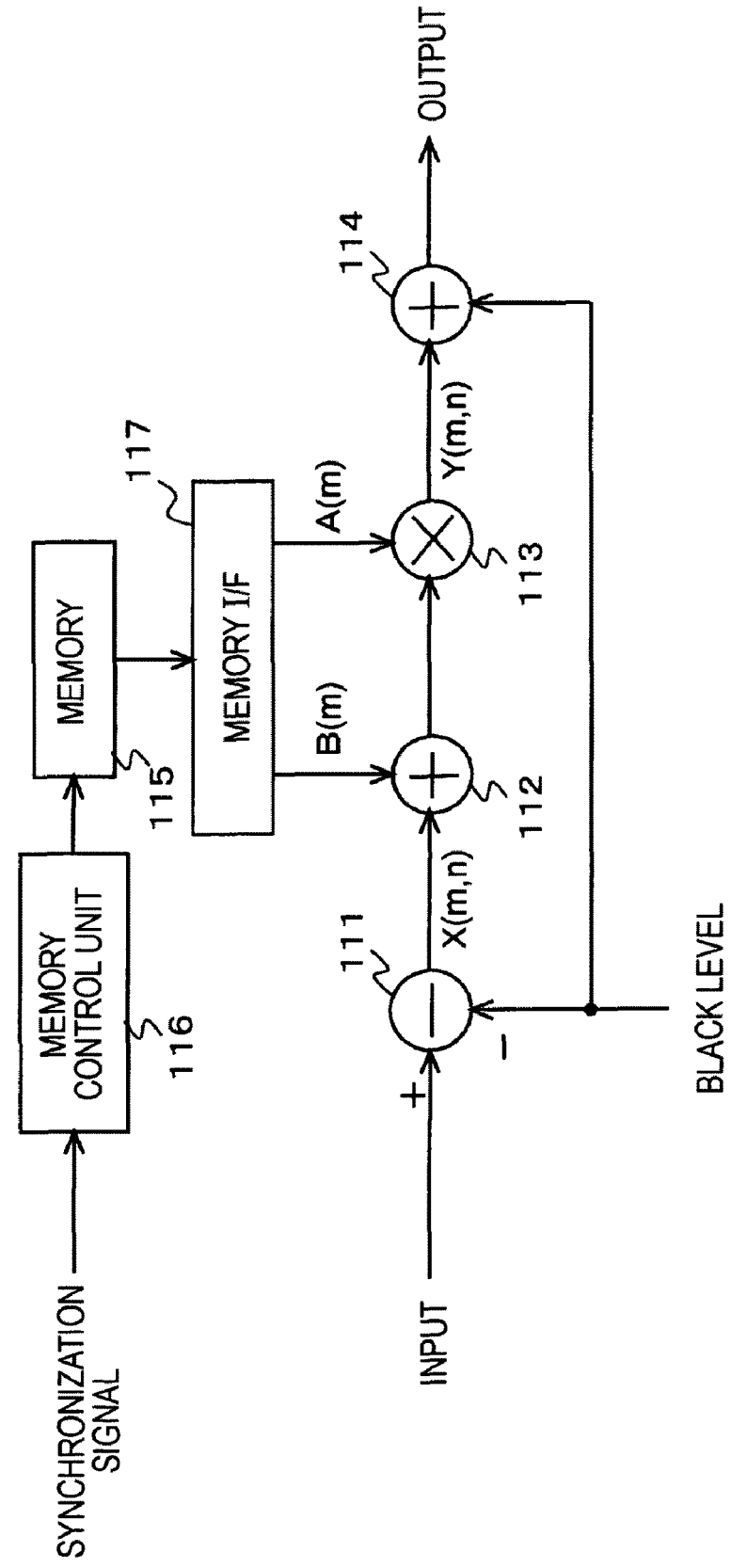
FIG. 7 is a block diagram of the configuration of a vertical streak noise removal circuit that uses correction signals corresponding to the offset component and the light-intensity-dependent component.

FIG. 7 is a schematic illustration of a vertical streak noise removal circuit 110A. The vertical streak noise removal circuit 110A removes vertical streak noise using equation (1). The vertical streak noise removal circuit 110A includes a subtracter 111, an adder 112, a multiplier 113, an adder 114, a memory 115, a memory control unit 116, and a memory interface (I/F) 117. The memory 115, the memory control unit 116, and the memory I/F 117 form a correction signal output unit. In addition, the subtracter 111, the adder 112, the multiplier 113, and the adder 114 form a signal correction unit.

The memory 115 prestores correction signals A(m) and B(m) for each of the output systems computed as described above. As shown in FIG. 2, when the CMOS image sensor 101 includes an output system (e.g., the signal processing circuit including the column amplifier 26 and the A/D converter 27) for each of the columns, the number of the output systems is the same as the number of the columns. In contrast, for example, as shown in FIG. 8, when the CMOS image sensor 101 includes an output system for every plurality of the columns, the number of the output systems is smaller than the number of the columns.

Figure 8:
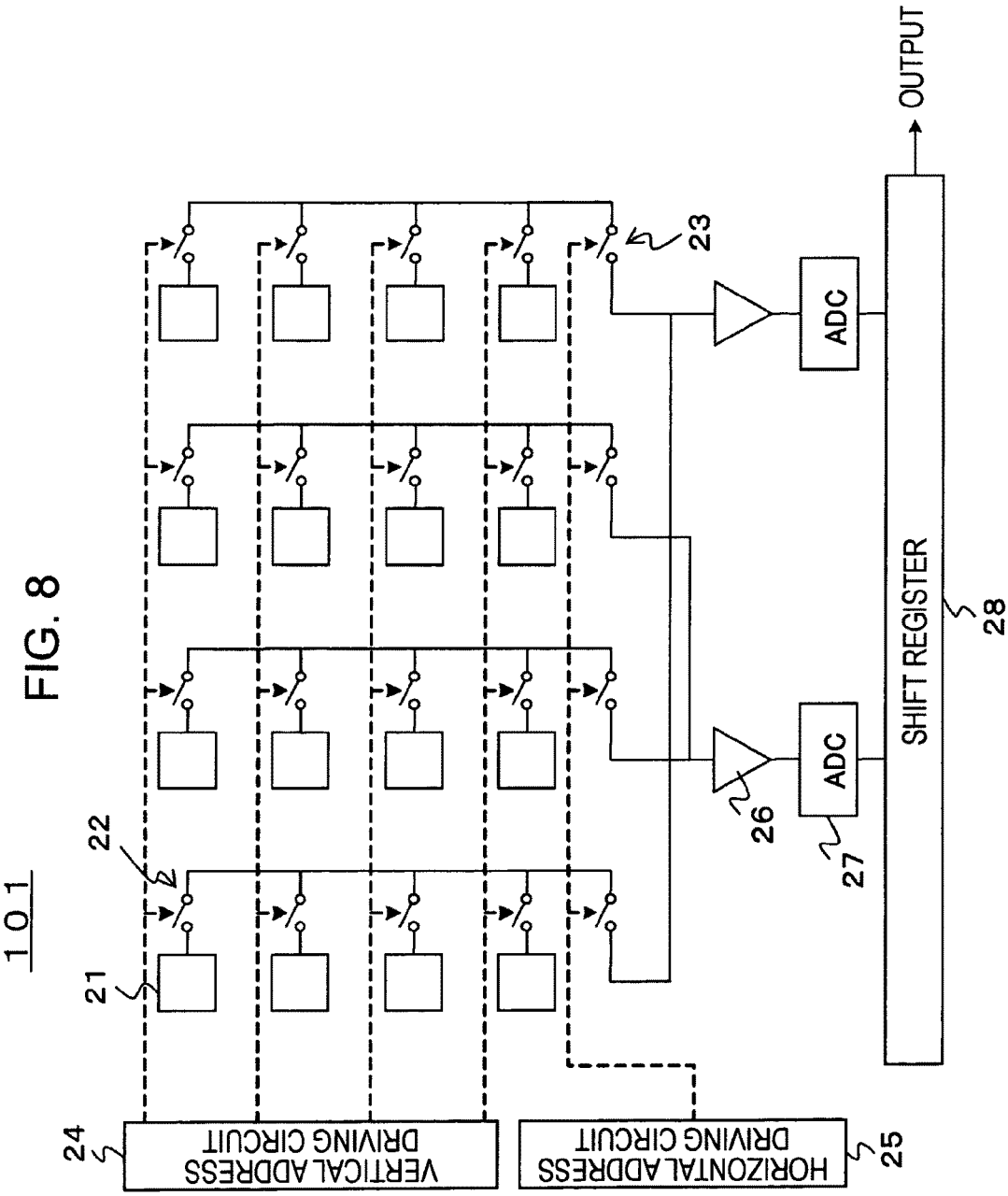
FIG. 8 illustrates an example configuration of a column-based CMOS image sensor in which an output system is provided to every two columns.

Like the example configuration of the image sensor 101 shown in FIG. 2, in an example configuration of the image sensor 101 shown in FIG. 8, pixels are arranged in rows of four, and pixels are arranged in columns of four. In this configuration shown in FIG. 8, an output system is provided for every two columns. Note that similar numbering will be used in describing FIG. 8 as was utilized above in describing FIG. 2, and therefore, the detailed description is not repeated.

Synchronization signals, such as a horizontal synchronization signal and a pixel clock signal, are supplied to the memory control unit 116 in synchronization with the output signal of the image sensor 101 input to the memory control unit 116. Using the synchronization signals, the memory control unit 116 reads out, from the memory 115, the correction signals A(m) and B(m) corresponding to the output system that outputs the output signal of the image sensor 101. In this case, the correction signals A(m) and B(m) read out from the memory 115 are integrated into one signal. For example, the integrated signal is 20 bits, where the most significant 10 bits represent the correction signal A(m), and the least significant 10 bits represent the correction signal B(m).

The memory I/F 117 separates the correction signal A(m) from the correction signal B(m) in the output signal of the memory 115. Thereafter, the memory I/F 117 supplies the correction signal B(m) to the adder 112 and supplies the correction signal A(m) to the multiplier 113.

The subtracter 111 subtracts a black level from the input (i.e., the output signal of the image sensor 101). The black level is supplied from, for example, a register (not shown). The adder 112 adds the correction signal B(m) to an output signal X(m, n) of the subtracter 111. The multiplier 113 multiplies the output signal of the adder 112 by the correction signal A(m). The adder 114 adds the black level to the output signal of the multiplier 113. Thus, an output is obtained.

An exemplary operation performed by the vertical streak noise removal circuit 110A shown in FIG. 7 is described next. In this example, the output signal of the CMOS image sensor 101 from an address (m, n) is input to the vertical streak noise removal circuit 110A.

In this case, correction signals A(m) and B(m) corresponding to the output system that outputs the output signal from the address (m, n) of the CMOS image sensor 101 are read out from the memory 115 under the control of the memory control unit 116. At that time, the memory I/F 117 supplies the correction signal B(m) to the adder 112, and supplies the correction signal A(m) to the multiplier 113.

In addition, the output signal from the address (m, n) of the CMOS image sensor 101 is input to the subtracter 111. Furthermore, the black level is supplied to the subtracter 111. The subtracter 111 subtracts the black level from the input. An output signal X(m, n) of the subtracter 111 is supplied to the adder 112. The adder 112 adds the correction signal B(m) to the signal X(m, n).

The output signal $\{X(m, n)+B(m)\}$ of the adder 112 is supplied to the multiplier 113. The multiplier 113 multiplies the signal $\{X(m, n)+B(m)\}$ by the correction signal A(m). The output signal $Y(m, n)=A(m)*\{X(m, n)+B(m)\}$ of the multiplier 113 is supplied to the adder 114. In this case, even when the signal X(m, n) contains vertical streak noise, the signal Y(m, n) does not contain the vertical streak noise. The adder 114 adds the black level back to the signal Y(m, n). Thus, the output of the vertical streak noise removal circuit 110A can be obtained.

The vertical streak noise removal circuit 110A shown in FIG. 7 removes not only the offset component of the vertical streak noise generated by each of the output systems of the CMOS image sensor 101 but also vertical streak noise from the output signal of the CMOS image sensor 101 on the basis of the correction signals A(m) and B(m) corresponding to the light-intensity-dependent component. Accordingly, vertical streak noise (vertical streak fixed pattern noise) can be effectively removed.

In addition, the vertical streak noise removal circuit 110A shown in FIG. 7 removes vertical streak noise by subtracting the black level from the output signal of the CMOS image sensor 101, performing computation using the correction signals A(m) and B(m), and adding the black level back to the output signal. In this way, the vertical streak noise removal circuit 110A can sufficiently remove vertical streak noise without being influenced by the black level.

The vertical streak noise removal circuit 110A shown in FIG. 7 uses the correction signals A(m) and B(m) for each of the output systems of the CMOS image sensor 101 stored in the memory 115. However, the correction signals A(m) and B(m) for each of the output systems of the CMOS image sensor 101 may be set in a register.

Figure 9:
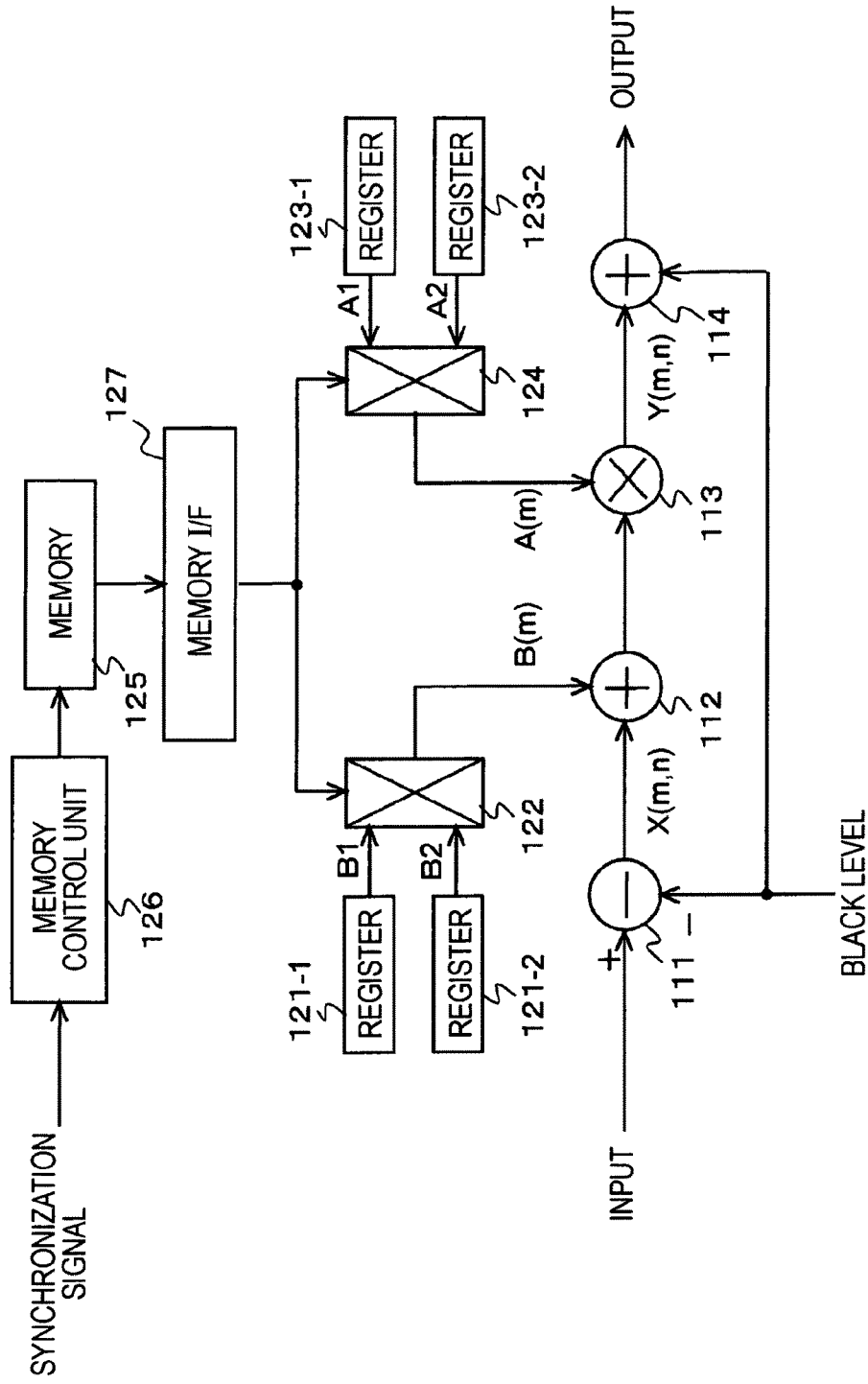
FIG. 9 is a block diagram of a vertical streak noise removal circuit in which correction signals are set in a register and an output selection signal for each of the output systems is supplied from a memory.

FIG. 9 is a block diagram of a vertical streak noise removal circuit 110B in which the correction signals A(m) and B(m) for each of the output systems of the CMOS image sensor 101 are set in registers. Similar numbering will be used in describing FIG. 9 as was utilized above in describing FIG. 7.

The vertical streak noise removal circuit 110B includes a subtracter 111, an adder 112, a multiplier 113, an adder 114, registers 121-1, 121-2, 123-1, and 123-2, selectors 122 and 124, a memory 125, a memory control unit 126, and a memory interface (I/F) 127. The registers 121-1, 121-2, 123-1, and 123-2, the selectors 122 and 124, the memory 125, the memory control unit 126, and the memory I/F 127 form a correction signal output unit. In addition, the subtracter 111, the adder 112, the multiplier 113, and the adder 114 form a signal correction unit.

Correction signals B(m) (B1 and B2) for each of the output systems of the CMOS image sensor 101 are set in the registers 121-1 and 121-2. Similarly, correction signals A(m) (A1 and A2) for each of the output systems of the CMOS image sensor 101 are set in the registers 123-1 and 123-2. As shown in FIG. 8, a vertical streak noise removal circuit 110B shown in FIG. 9 corresponds to the CMOS image sensor 101 having two output systems (signal processing circuits, each including the column amplifier 26 and the A/D converter 27).

The memory 125 prestores an output selection signal corresponding to each of the output systems. Synchronization signals, such as a horizontal synchronization signal and a pixel clock signal, are supplied to the memory control unit 126 in synchronization with the output signal of the image sensor 101 input to the memory control unit 126. Using the synchronization signals, the memory control unit 126 reads out, from the memory 125, the output selection signal corresponding to the output system that outputs the output signal of the image sensor 101. The memory I/F 127 supplies the output selection signal read out from the memory 125 to the selectors 122 and 124.

The selector 122 selectively retrieves the correction signal B(m) of the output system that outputs the output signal of the CMOS image sensor 101 from the correction signals B1 and B2 output from the registers 121-1 and 121-2 on the basis of the output selection signal sent from the memory I/F 127. The selector 122 then supplies the correction signal B(m) to the adder 112. The selector 124 selectively retrieves the correction signal A(m) of the output system that outputs the output signal of the CMOS image sensor 101 from the correction signals A1 and A2 output from the registers 123-1 and 123-2 on the basis of the output selection signal sent from the memory I/F 127. The selector 124 then supplies the correction signal A(m) to the multiplier 113.

The other configurations of the vertical streak noise removal circuit 110B shown in FIG. 9 are similar to those of the vertical streak noise removal circuit 110A shown in FIG. 7.

An exemplary operation performed by the vertical streak noise removal circuit 110B shown in FIG. 9 is described next. In this example, the output signal of the CMOS image sensor 101 from an address (m, n) is input to the vertical streak noise removal circuit 110B.

In this case, an output selection signal corresponding to the output system that outputs the output signal from the address (m, n) of the CMOS image sensor 101 is read out from the memory 125 under the control of the memory control unit 126. At that time, the output selection signal is supplied to the selectors 122 and 124 via the memory I/F 127.

Subsequently, the selector 122 retrieves the correction signal B(m) corresponding to the output system that outputs the output signal of the CMOS image sensor 101 from the correction signals B1 and B2 output from the registers 121-1 and 121-2 on the basis of the output selection signal. The selector 122 then supplies the correction signal B(m) to the adder 112. While, the selector 124 retrieves the correction signal A(m) corresponding to the output system that outputs the output signal of the CMOS image sensor 101 from the correction signals A1 and A2 output from the registers 123-1 and 123-2 on the basis of the output selection signal. The selector 124 then supplies the correction signal A(m) to the multiplier 113.

In addition, the output signal from the address (m, n) of the CMOS image sensor 101 is input to the subtracter 111. Furthermore, the black level is supplied to the subtracter 111. The subtracter 111 subtracts the black level from the input. An output signal X(m, n) of the subtracter 111 is supplied to the adder 112. The adder 112 adds the correction signal B(m) to the signal x(m, n).

The output signal {X(m, n)+B(m)} of the adder 112 is supplied to the multiplier 113. The multiplier 113 multiplies the signal {X(m, n)+B(m)} by the correction signal A(m). The output signal Y(m, n)=A(m)*{X(m, n)+B(m)} of the multiplier 113 is supplied to the adder 114. In this case, even when the signal X(m, n) contains vertical streak noise, the signal Y(m, n) does not contain the vertical streak noise. The adder 114 adds the black level back to the signal Y(m, n). Thus, the output of the vertical streak noise removal circuit 110B can be obtained.

The vertical streak noise removal circuit 110B shown in FIG. 9 can provide an advantage that is the same as that of the vertical streak noise removal circuit 110A shown in FIG. 7. In addition, since the memory 125 of the vertical streak noise removal circuit 110B shown in FIG. 9 stores the output selection signal that has a bit length smaller than those of the correction signals A(m) and B(m), the memory capacity can be reduced. As noted above, a vertical streak noise removal circuit having a plurality of registers that output the correction signals A(m) and B(m) corresponding to each of the output systems is advantageous when the number of the output systems disposed in parallel is small.

The vertical streak noise removal circuit 110B shown in FIG. 9 reads out the output selection signal used by the selectors 122 and 124 from the memory 125. However, a counter value in a counter may be used in place of the output selection signal.

Figure 10:
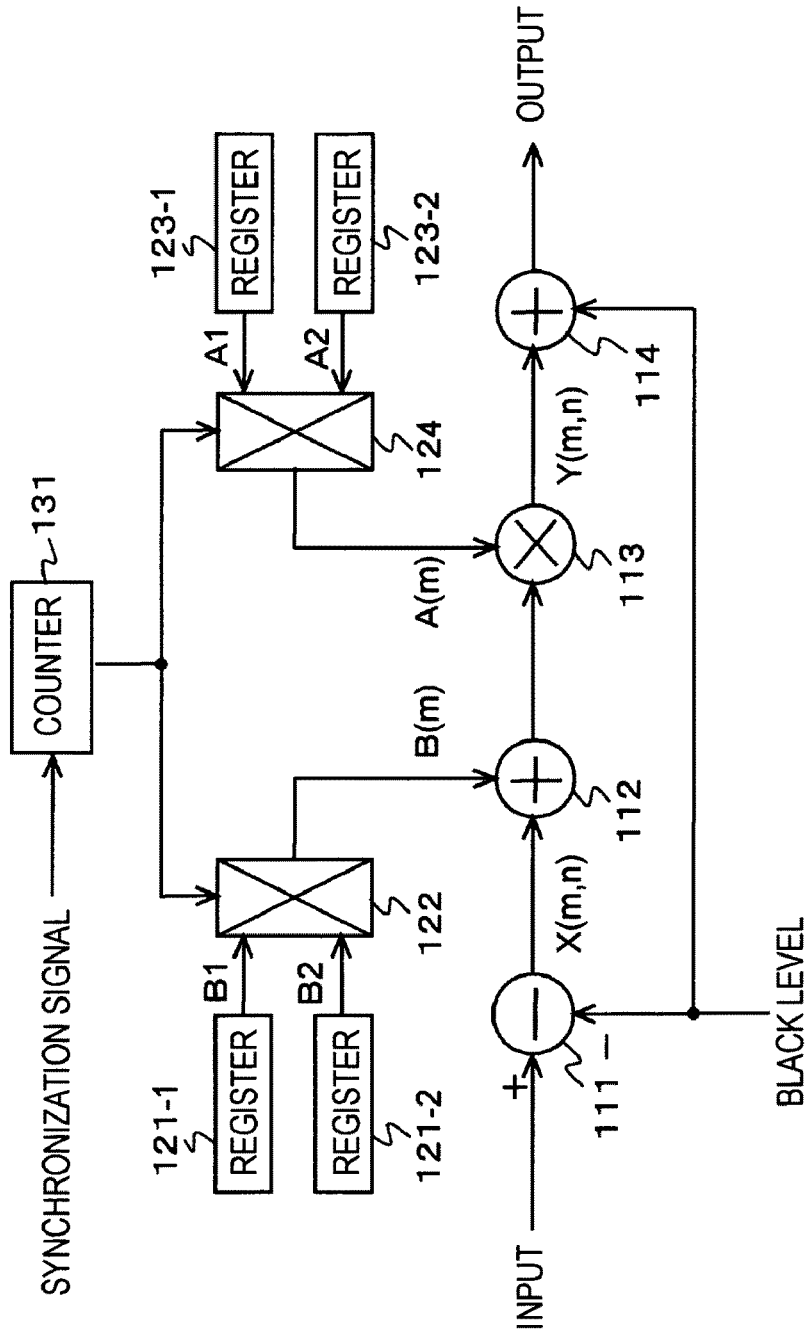
FIG. 10 is a block diagram of a vertical streak noise removal circuit in which correction signals are set in a register and an output selection signal for each of the output systems is supplied in the form of a counter value.

FIG. 10 is a block diagram of a vertical streak noise removal circuit 110C that uses a counter value in a counter in place of the output selection signal. Similar numbering will be used in describing FIG. 10 as was utilized above in describing FIG. 9.

The vertical streak noise removal circuit 110C includes a subtracter 111, an adder 112, a multiplier 113, an adder 114, registers 121-1, 121-2, 123-1, and 123-2, selectors 122 and 124, and a counter 131. The registers 121-1, 121-2, 123-1, and 123-2, the selectors 122 and 124, and the counter 131 form a correction signal output unit. In addition, the subtracter 111, the adder 112, the multiplier 113, and the adder 114 form a signal correction unit.

Synchronization signals, such as a horizontal synchronization signal and a pixel clock signal, are supplied to the counter 131 in synchronization with the output signal of the image sensor 101 input to the counter 131. For example, the counter 131 is reset on the basis of the horizontal synchronization signal and is sequentially counted up on the basis of the pixel clock signal. Accordingly, the counter value in the counter 131 represents a column address m of an output signal of the CMOS image sensor 101 input to the counter 131. The counter value in the counter 131 is output to the selectors 122 and 124 so as to serve as an output selection signal.

The selector 122 selectively retrieves the correction signal B(m) for the output system that outputs the output signal of the CMOS image sensor 101 from the correction signals B1 and B2 output from the registers 121-1 and 121-2 on the basis of the counter value output from the counter 131. The selector 122 then supplies the correction signal B(m) to the adder 112. The selector 124 selectively retrieves the correction signal A(m) for the output system that outputs the output signal of the CMOS image sensor 101 from the correction signals A1 and A2 output from the registers 123-1 and 123-2 on the basis of the counter value output from the counter 131. The selector 124 then supplies the correction signal A(m) to the multiplier 113.

The other configurations of the vertical streak noise removal circuit 110C shown in FIG. 10 are similar to those of the vertical streak noise removal circuit 110B shown in FIG. 9. In addition, the operation of the vertical streak noise removal circuit 110C shown in FIG. 10 is similar to that of the vertical streak noise removal circuit 110B shown in FIG. 9 except that the selectors 122 and 124 perform the retrieval operations using the counter value output from the counter 131.

3 The vertical streak noise removal circuit 110C shown in FIG. 10 can provide an advantage that is the same as that of the vertical streak noise removal circuit 110B shown in FIG. 9. In addition, since the vertical streak noise removal circuit 110C shown in FIG. 10 sets the correction signals A(m) and B(m) in the registers and uses the counter value stored in the counter 131, the need for a memory can be eliminated.

Vertical streak noise generated by the output system may vary in accordance with a variation in the property of the output system due to a temperature change, a variation in the gain of an amplifier included in the output system, and a variation in the operation of an image sensor due to the selection of an interlace driving method or a progressive driving method. To compensate for the change in the vertical streak noise, the gains of the correction signals A(m) and B(m) may be controlled.

Figure 11:
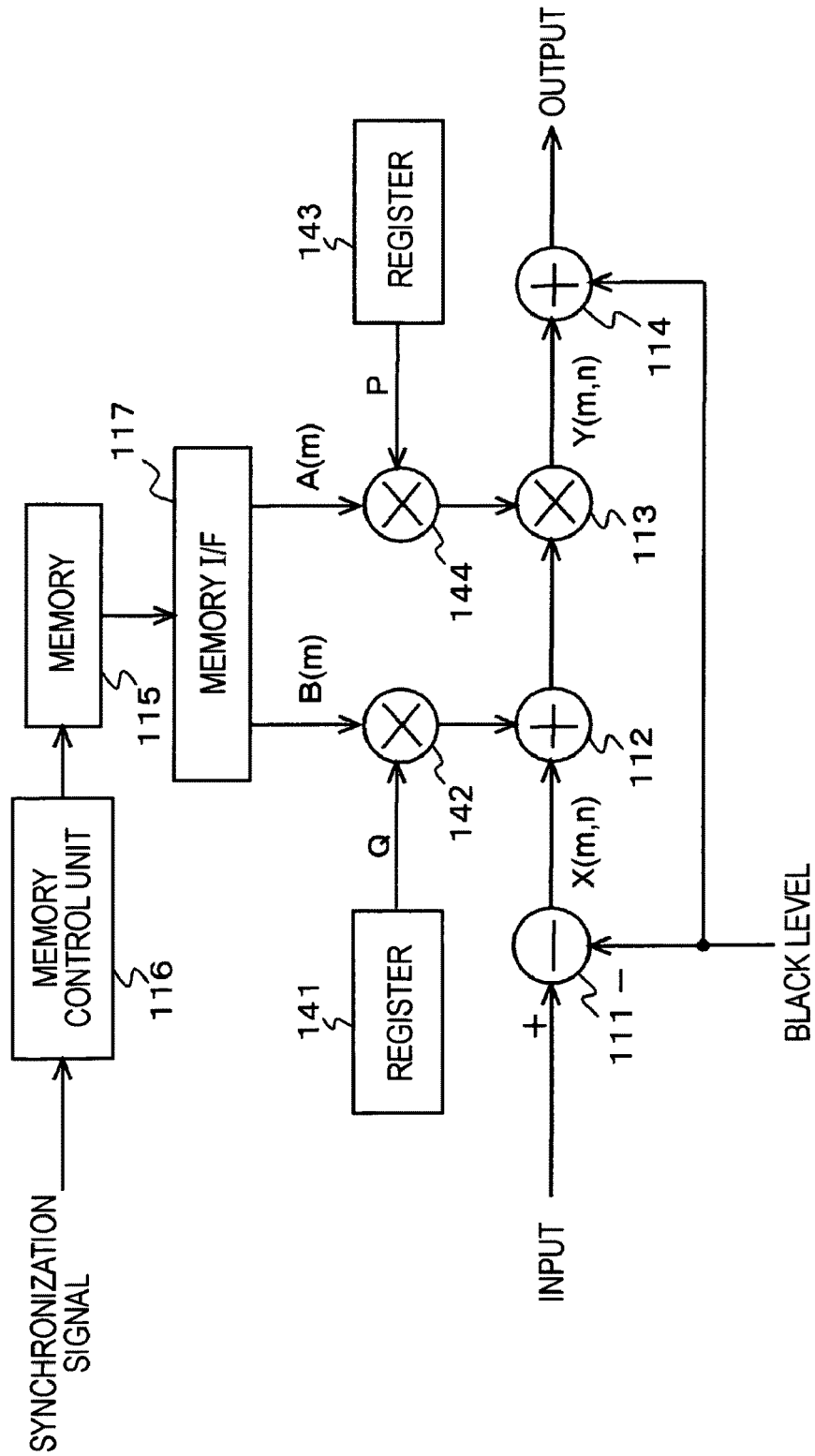
FIG. 11 is a block diagram of a vertical streak noise removal circuit in which the gains of correction signals are corrected using correction coefficients set in a register.

FIG. 11 is a block diagram of a vertical streak noise removal circuit 110D that can control the gains of the correction signals A(m) and B(m). Similar numbering will be used in describing FIG. 11 as was utilized above in describing FIG. 7.

The vertical streak noise removal circuit 110D includes a subtracter 111, an adder 112, a multiplier 113, an adder 114, a memory 115, a memory control unit 116, a memory I/F 117, registers 141 and 143, and multipliers 142 and 144. The memory 115, the memory control unit 116, and the memory I/F 117 form a correction signal output unit. In addition, the subtracter 111, the adder 112, the multiplier 113, and the adder 114 form a signal correction unit. Furthermore, the registers 141 and 143 form a correction coefficient output unit. The multipliers 142 and 144 form a gain correction unit.

A correction coefficient Q used for correcting the gain of the correction signal B(m) is set in the register 141. In addition, a correction coefficient P used for correcting the gain of the correction signal A(m) is set in the register 143. The correction coefficients Q and P set in the registers 141 and 143 are appropriately changed in accordance with a variation in the property of the output system due to a temperature change, a variation in the gain of an amplifier included in the output system, and a variation in the operation of an image sensor due to the selection of an interlace driving method or a progressive driving method.

The multiplier 142 multiplies the correction signal B(m) output from the memory I/F 117 by the correction coefficient Q output from the register 141 so as to correct the gain. Thereafter, the multiplier 142 supplies the gain-corrected correction coefficient Q*B(m) to the adder 112. While, the multiplier 144 multiplies the correction signal A(m) output from the memory I/F 117 by the correction coefficient P output from the register 143 so as to correct the gain. Thereafter, the multiplier 144 supplies the gain-corrected correction signal P*A(m) to the multiplier 113.

The other configurations of the vertical streak noise removal circuit 110D shown in FIG. 11 are similar to those of the vertical streak noise removal circuit 110A shown in FIG. 7.

An exemplary operation performed by the vertical streak noise removal circuit 110D shown in FIG. 11 is described next. In this example, the output signal of the CMOS image sensor 101 from an address (m, n) is input to the vertical streak noise removal circuit 110D.

In this case, correction signals A(m) and B(m) corresponding to the output system that outputs the output signal from the address (m, n) of the CMOS image sensor 101 are read out from the memory 115 under the control of the memory control unit 116. Thereafter, the correction signals A(m) and B(m) output from the memory I/F 117 are supplied to the multipliers 142 and 144, respectively.

The multiplier 142 multiplies the correction signal B(m) by the correction coefficient Q output from the register 141 so as to correct the gain of the correction signal B(m). The gain-corrected correction signal Q*B(m) is supplied to the adder 112. While, the multiplier 144 multiplies the correction signal A(m) by the correction coefficient P output from the register 143 so as to correct the gain of the correction signal A(m). The gain-corrected correction signal P*A(m) is supplied to the multiplier 113.

In addition, the output signal from the address (m, n) of the CMOS image sensor 101 is input to the subtracter 111. Furthermore, the black level is supplied to the subtracter 111. The subtracter 111 subtracts the black level from the input. An output signal X(m, n) of the subtracter 111 is supplied to the adder 112. The adder 112 adds the gain-corrected correction signal Q*B(m) to the signal X(m, n).

The output signal {X(m, n)+Q*B(m)} of the adder 112 is supplied to the multiplier 113. The multiplier 113 multiplies the signal {X(m, n)+Q*B(m)} by the gain-corrected correction signal P*A(m). The output signal Y(m, n)=P*A(m)*{X(m, n)+Q*B(m)} of the multiplier 113 is supplied to the adder 114. In this case, even when the signal X(m, n) contains vertical streak noise, the signal Y(m, n) does not contain the vertical streak noise. The adder 114 adds the black level back to the signal Y(m, n). Thus, the output of the vertical streak noise removal circuit 110D can be obtained.

The vertical streak noise removal circuit 110D shown in FIG. 11 can provide an advantage that is the same as that of the vertical streak noise removal circuit 110A shown in FIG. 7. In addition, since the vertical streak noise removal circuit 110D shown in FIG. 11 multiplies the correction signals B(m) and A(m) by the correction coefficients Q and P, respectively, so as to obtain gain-corrected correction signals Q*B(m) and P*A(m). Subsequently, the vertical streak noise removal circuit 110D uses these gain-corrected correction signals Q*B(m) and P*A(m). Thus, the vertical streak noise removal circuit 110D can compensate for a change in vertical streak noise caused by a variation in the property of the output system due to a temperature change, a variation in the gain of an amplifier included in the output system, and a variation in the operation of an image sensor due to the selection of an interlace driving method or a progressive driving method.

In the vertical streak noise removal circuit 110D shown in FIG. 11, the same correction coefficients P and Q are applied to all of the output systems. However, a variation in the property of the output system due to a temperature change, a variation in the gain of an amplifier included in the output system, and a variation in the operation of an image sensor due to the selection of an interlace driving method or a progressive driving method may be different for each of the output systems. Accordingly, the different optimal correction coefficients P and Q may be used for each of the output systems.

Figure 12:
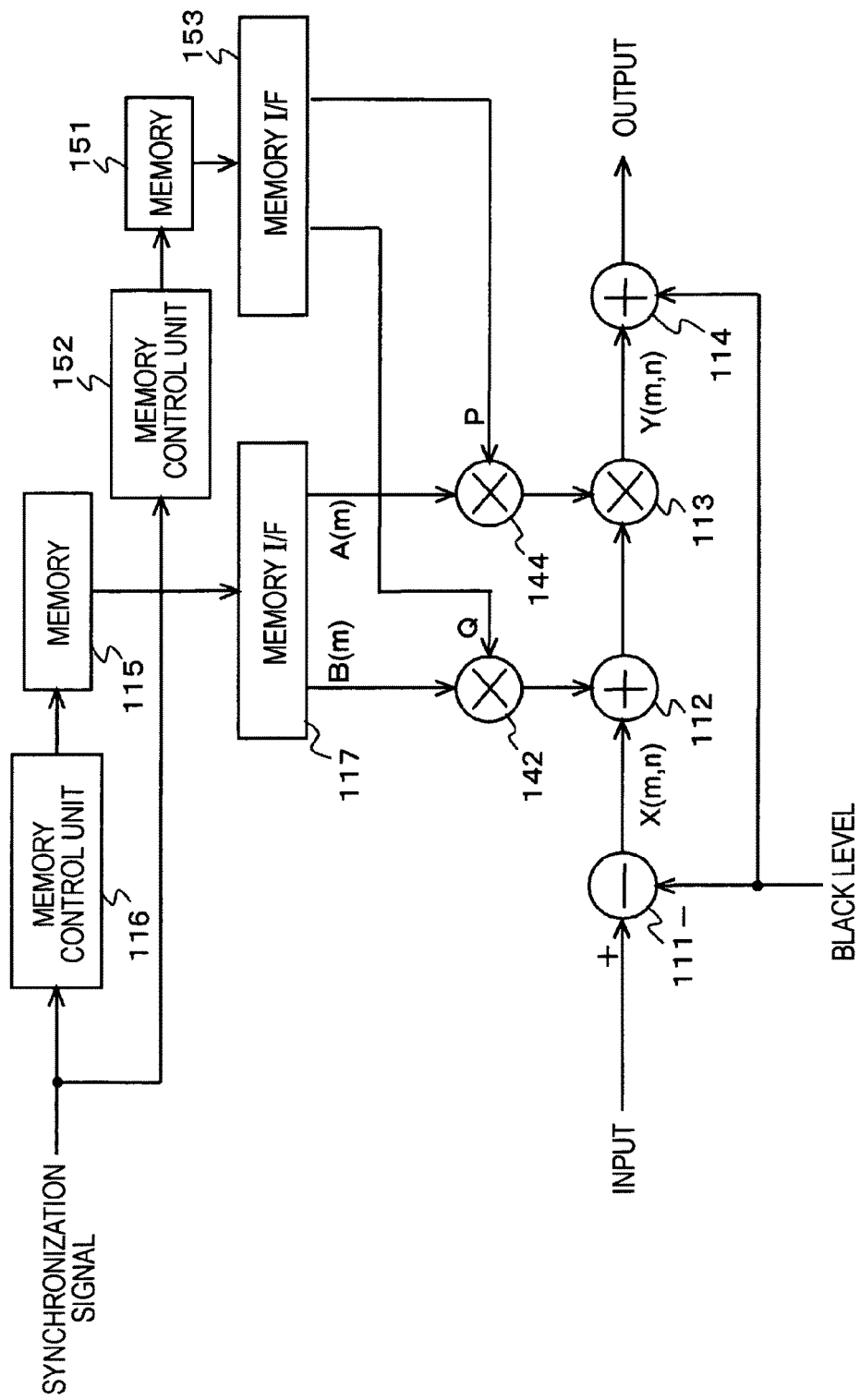
FIG. 12 is a block diagram of a vertical streak noise removal circuit in which the gains of correction signals are corrected using correction coefficients read out from a memory for each of the output systems.

FIG. 12 is a block diagram of a vertical streak noise removal circuit 110E that uses the different optimal correction coefficients P and Q for each of the output systems. Similar numbering will be used in describing FIG. 12 as was utilized above in describing FIG. 11.

The vertical streak noise removal circuit 110E includes a subtracter 111, an adder 112, a multiplier 113, an adder 114, a memory 115, a memory control unit 116, a memory I/F 117, multipliers 142 and 144, a memory 151, a memory control unit 152, and a memory I/F 153. The memory 115, the memory control unit 116, and the memory I/F 117 form a correction signal output unit. In addition, the subtracter 111, the adder 112, the multiplier 113, and the adder 114 form a signal correction unit. Furthermore, the memory 151, the memory control unit 152, and the memory I/F 153 form a correction coefficient output unit. The multipliers 142 and 144 form a gain correction unit.

The memory 151 prestores the correction coefficients P and Q for each of the output systems. Synchronization signals, such as a horizontal synchronization signal and a pixel clock signal, are supplied to the memory control unit 152 in synchronization with the output signal of the image sensor 101 input to the memory control unit 152. Using the synchronization signals, the memory control unit 152 reads out, from the memory 151, the correction coefficients P and Q corresponding to the output system that outputs the output signal of the image sensor 101. In this case, the correction coefficients P and Q read out from the memory 151 are integrated into one signal. For example, the upper half bits of the integrated signal represent the correction coefficient P, and the lower half bits represent the correction coefficient Q. The memory I/F 153 separates the correction coefficient P from the correction coefficient Q in the output signal of the memory 151. Thereafter, the memory I/F 153 supplies the correction coefficient Q to the adder 142 and supplies the correction coefficient P to the multiplier 144.

The multiplier 142 multiplies the correction signal B(m) output from the memory I/F 117 by the correction coefficient Q output from the memory I/F 153 so as to correct the gain. Thereafter, the multiplier 142 supplies the gain-corrected correction coefficient Q*B(m) to the adder 112. While, the multiplier 144 multiplies the correction signal A(m) output from the memory I/F 117 by the correction coefficient P output from the memory I/F 153 so as to correct the gain. Thereafter, the multiplier 144 supplies the gain-corrected correction signal P*A(m) to the multiplier 113.

The other configurations of the vertical streak noise removal circuit 110E shown in FIG. 12 are similar to those of the vertical streak noise removal circuit 110D shown in FIG. 11.

An exemplary operation performed by the vertical streak noise removal circuit 110E shown in FIG. 12 is described next. In this example, the output signal of the CMOS image sensor 101 from an address (m, n) is input to the vertical streak noise removal circuit 110E.

In this case, correction signals A(m) and B(m) corresponding to the output system that outputs the output signal from the address (m, n) of the CMOS image sensor 101 are read out from the memory 115 under the control of the memory control unit 116. Thereafter, the correction signals A(m) and B(m) output from the memory I/F 117 are supplied to the multipliers 142 and 144, respectively.

In addition, the correction coefficients P and Q corresponding to the output system that outputs the output signal from the address (m, n) of the CMOS image sensor 101 are read out from the memory 151 under the control of the memory control unit 152. Thereafter, the correction coefficients P and Q output from the memory I/F 153 are supplied to the multipliers 142 and 144, respectively.

The multiplier 142 multiplies the correction signal B(m) by the correction coefficient Q so as to correct the gain of the correction signal B(m). The gain-corrected correction signal Q*B(m) is supplied to the adder 112. While, the multiplier 144 multiplies the correction signal A(m) by the correction coefficient P so as to correct the gain of the correction signal A(m). The gain-corrected correction signal P*A(m) is supplied to the multiplier 113.

In addition, the output signal from the address (m, n) of the CMOS image sensor 101 is input to the subtracter 111. Furthermore, the black level is supplied to the subtracter 111. The subtracter 111 subtracts the black level from the input. An output signal X(m, n) of the subtracter 111 is supplied to the adder 112. The adder 112 adds the gain-corrected correction signal Q*B(m) to the signal X(m, n).

The output signal {X(m, n)+Q*B(m)} of the adder 112 is supplied to the multiplier 113. The multiplier 113 multiplies the signal {X(m, n)+Q*B(m)} by the gain-corrected correction signal P*A(m). The output signal Y(m, n)=P*A(m)*{X(m, n)+Q*B(m)} of the multiplier 113 is supplied to the adder 114. In this case, even when the signal X(m, n) contains vertical streak noise, the signal Y(m, n) does not contain the vertical streak noise. The adder 114 adds the black level back to the signal Y(m, n). Thus, the output of the vertical streak noise removal circuit 110E can be obtained.

The vertical streak noise removal circuit 110E shown in FIG. 12 can provide an advantage that is the same as that of the vertical streak noise removal circuit 110D shown in FIG. 11. In addition, the vertical streak noise removal circuit 110E shown in FIG. 12 can correct the gains of the correction signals B(m) and A(m) by using the correction coefficients Q and P that are optimal for each of the output systems.

In the vertical streak noise removal circuit 110E shown in FIG. 12, the correction coefficients Q and P for each of the output systems of the CMOS image sensor 101 are prestored in the memory 151. However, the correction coefficients Q and P for each of the output systems of the CMOS image sensor 101 may be set in a register.

Figure 13:
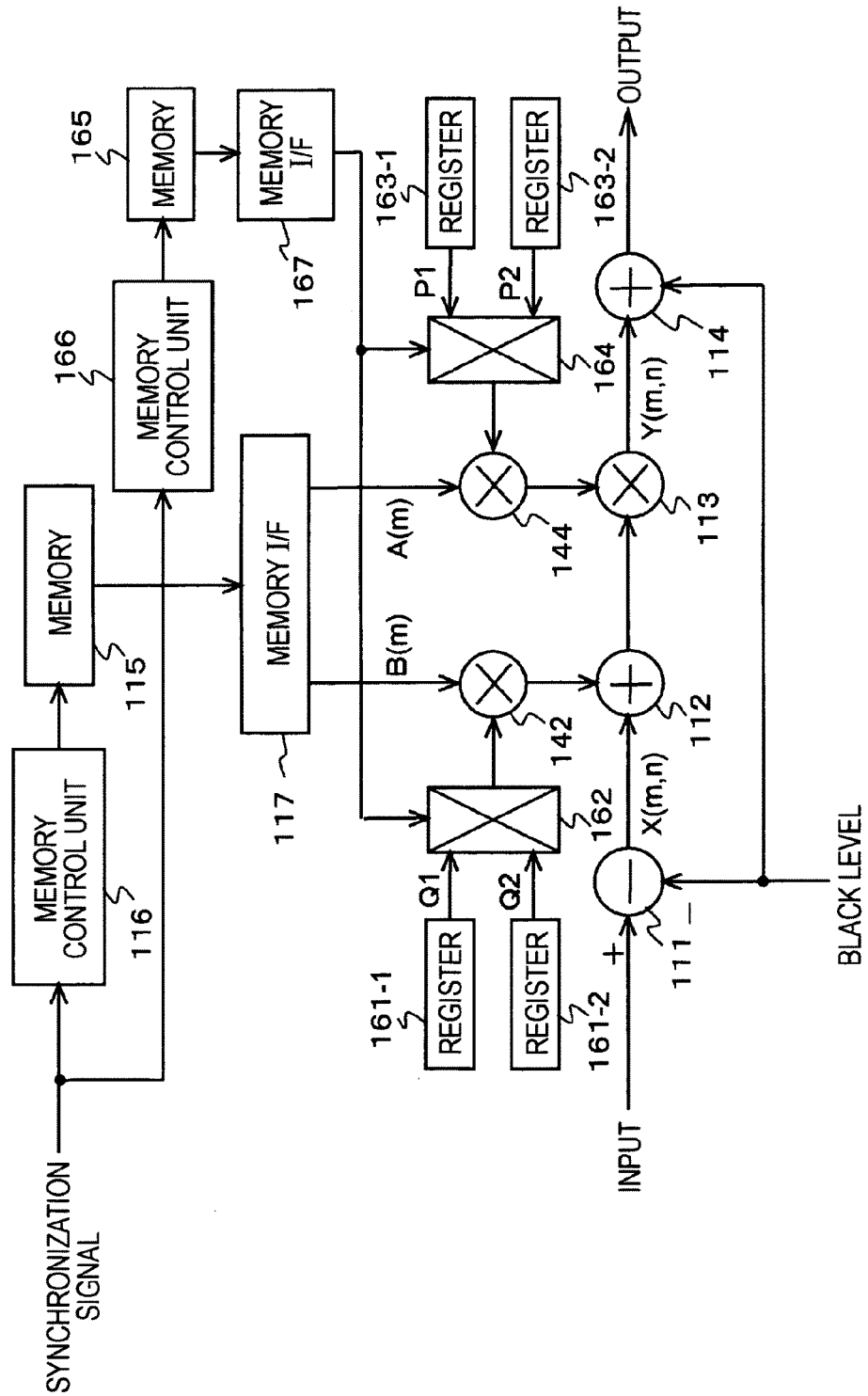
FIG. 13 is a block diagram of a vertical streak noise removal circuit in which the gains of correction signals are corrected using correction coefficients set in a register for each of the output systems.

FIG. 13 is a block diagram of a vertical streak noise removal circuit 110F in which the correction coefficients Q and P for each of the output systems of the CMOS image sensor 101 are set in a register. Similar numbering will be used in describing FIG. 13 as was utilized above in describing FIG. 12.

The vertical streak noise removal circuit 110F includes a subtracter 111, an adder 112, a multiplier 113, an adder 114, a memory 115, a memory control unit 116, a memory I/F 117, multipliers 142 and 144, registers 161-1, 161-2, 163-1, and 163-2, selectors 162 and 164, a memory 165, a memory control unit 166, and a memory interface (I/F) 167. The memory 115, the memory control unit 116, and the memory I/F 117 form a correction signal output unit. In addition, the subtracter 111, the adder 112, the multiplier 113, and the adder 114 form a signal correction unit. The registers 161-1, 161-2, 163-1, and 163-2, the selectors 162 and 164, the memory 165, the memory control unit 166, and the memory I/F 167 form a correction coefficient output unit. The multipliers 142 and 144 form a gain correction unit.

The correction coefficients Q1 and Q2 for each of the output systems of the CMOS image sensor 101 are set in the registers 161-1 and 161-2. Similarly, the correction coefficients P1 and P2 for each of the output systems of the CMOS image sensor 101 are set in the registers 163-1 and 163-2. As shown in FIG. 8, a vertical streak noise removal circuit 110F shown in FIG. 13 corresponds to the CMOS image sensor 101 having two output systems (signal processing circuits, each including the column amplifier 26 and the A/D converter 27).

The memory 165 prestores an output selection signal corresponding to each of the output systems. Synchronization signals, such as a horizontal synchronization signal and a pixel clock signal, are supplied to the memory control unit 166 in synchronization with the output signal of the image sensor 101 input to the memory control unit 166. Using the synchronization signals, the memory control unit 166 reads out, from the memory 165, the output selection signal corresponding to the output system that outputs the output signal of the image sensor 101. The memory I/F 167 supplies the output selection signal read out from the memory 165 to the selectors 162 and 164.

The selector 162 selectively retrieves the correction coefficient Q for the output system that outputs the output signal of the CMOS image sensor 101 from the correction coefficients Q1 and Q2 output from the registers 161-1 and 161-2 on the basis of the output selection signal sent from the memory I/F 167. The selector 162 then supplies the correction coefficient Q to the multiplier 142. The selector 164 selectively retrieves the correction coefficient P of the output system that outputs the output signal of the CMOS image sensor 101 from the correction coefficients P1 and P2 output from the registers 163-1 and 163-2 on the basis of the output selection signal sent from the memory I/F 167. The selector 164 then supplies the correction coefficient P to the multiplier 144.

The multiplier 142 multiplies the correction signal B(m) output from the memory I/F 117 by the correction coefficient Q output from the selector 162 so as to correct the gain. Thereafter, the multiplier 142 supplies the gain-corrected correction coefficient Q*B(m) to the adder 112. While, the multiplier 144 multiplies the correction signal A(m) output from the memory I/F 117 by the correction coefficient P output from the selector 164 so as to correct the gain. Thereafter, the multiplier 144 supplies the gain-corrected correction signal P*A(m) to the multiplier 113.

The other configurations of the vertical streak noise removal circuit 110F shown in FIG. 13 are similar to those of the vertical streak noise removal circuit 110E shown in FIG. 12.

An exemplary operation performed by the vertical streak noise removal circuit 110F shown in FIG. 13 is described next. In this example, the output signal of the CMOS image sensor 101 from an address (m, n) is input to the vertical streak noise removal circuit 100F.

In this case, correction signals A(m) and B(m) corresponding to the output system that outputs the output signal from the address (m, n) of the CMOS image sensor 101 are read out from the memory 115 under the control of the memory control unit 116. Thereafter, the correction signals A(m) and B(m) output from the memory I/F 117 are supplied to the multipliers 142 and 144, respectively.

In addition, output selection signals corresponding to the output system that outputs the output signal from the address (m, n) of the CMOS image sensor 101 are read out from the memory 165 under the control of the memory control unit 166. Thereafter, the output selection signals are supplied to the selectors 162 and 164 via the memory interface (I/F) 167, respectively.

The selector 162 retrieves the correction coefficient Q corresponding to the output system that outputs the output signal of the CMOS image sensor 101 from the correction coefficients Q1 and Q2 output from the registers 161-1 and 161-2 on the basis of the output selection signal. The selector 162 then supplies the correction coefficient Q to the multiplier 142. The selector 164 retrieves the correction coefficient P of the output system that outputs the output signal of the CMOS image sensor 101 from the correction coefficients P1 and P2 output from the registers 163-1 and 163-2 on the basis of the output selection signal. The selector 164 then supplies the correction coefficient P to the multiplier 144.

The multiplier 142 multiplies the correction signal B(m) by the correction coefficient Q so as to correct the gain of the correction signal B(m). Thereafter, the multiplier 142 supplies the gain-corrected correction coefficient Q*B(m) to the adder 112. While, the multiplier 144 multiplies the correction signal A(m) by the correction coefficient P so as to correct the gain of the correction signal A(m). Thereafter, the multiplier 144 supplies the gain-corrected correction signal P*A(m) to the multiplier 113.

In addition, the output signal from the address (m, n) of the CMOS image sensor 101 is input to the subtracter 111. Furthermore, the black level is supplied to the subtracter 111. The subtracter 111 subtracts the black level from the input. An output signal X(m, n) of the subtracter 111 is supplied to the adder 112. The adder 112 adds the gain-corrected correction signal Q*B(m) to the signal X(m, n).

The output signal {X(m, n)+Q*B(m)} of the adder 112 is supplied to the multiplier 113. The multiplier 113 multiplies the signal {X(m, n)+Q*B(m)} by the gain-corrected correction signal P*A(m) The output signal Y(m, n)=P*A(m)*{X(m, n)+Q*B(m)} of the multiplier 113 is supplied to the adder 114. In this case, even when the signal X(m, n) contains vertical streak noise, the signal Y(m, n) does not contain the vertical streak noise. The adder 114 adds the black level back to the signal Y(m, n). Thus, the output of the vertical streak noise removal circuit 110F can be obtained.

The vertical streak noise removal circuit 110F shown in FIG. 13 can provide an advantage that is the same as that of the vertical streak noise removal circuit 110E shown in FIG. 12. In addition, since the memory 165 of the vertical streak noise removal circuit 110F shown in FIG. 13 stores the output selection signal that has a bit length smaller than those of the correction coefficients P and Q, the memory capacity can be reduced. As noted above, a vertical streak noise removal circuit having a plurality of registers that output the correction coefficients P and Q corresponding to the output systems is advantageous when the number of the output systems disposed in parallel is small.

The vertical streak noise removal circuit 110A shown in FIG. 7 removes vertical streak noise using equation (1). A vertical streak noise removal circuit that removes vertical streak noise using equation (2) is described next.

Figure 14:
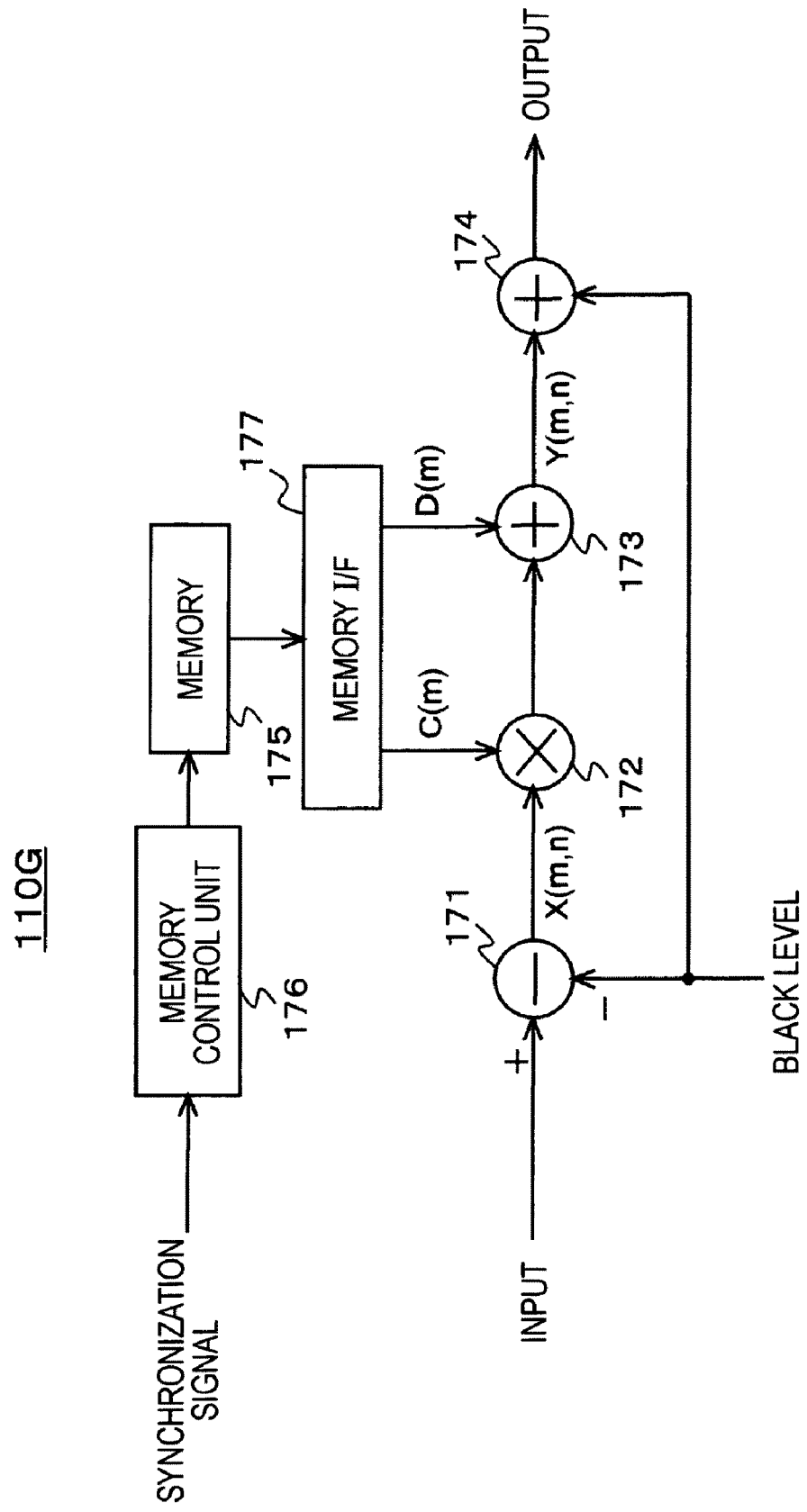
FIG. 14 is a block diagram of a vertical streak noise removal circuit that uses a correction signal corresponding to an offset component and a correction signal corresponding to the offset component and a light-intensity-dependent component.

FIG. 14 is a block diagram of a vertical streak noise removal circuit 110G that removes vertical streak noise using equation (2). The vertical streak noise removal circuit 110G includes a subtracter 171, a multiplier 172, an adder 173, an adder 174, a memory 175, a memory control unit 176, and a memory I/F 177. The memory 175, the memory control unit 176, and the memory I/F 177 form a correction signal output unit. In addition, the subtracter 171, the multiplier 172, and the adders 173 and 174 form a signal correction unit.

The memory 175 prestores correction signals C(m) and D(m) for each of the output systems computed as described above. As shown in FIG. 2, when the CMOS image sensor 101 includes an output system (e.g., a signal processing circuit including an amplifier and an A/D converter) for each of the columns, the number of the output systems is the same as the number of the columns. In contrast, for example, as shown in FIG. 8, when the CMOS image sensor 101 includes an output system for a plurality of the columns, the number of the output systems is smaller than the number of the columns.

Synchronization signals, such as a horizontal synchronization signal and a pixel clock signal, are supplied to the memory control unit 176 in synchronization with the output signal of the image sensor 101 input to the memory control unit 176. Using the synchronization signals, the memory control unit 176 reads out, from the memory 175, the correction signals C(m) and D(m) corresponding to the output system that outputs the output signal of the image sensor 101. In this case, the correction signals C(m) and D(m) read out from the memory 175 are integrated into one signal. For example, the integrated signal is 20 bits, where the most significant 10 bits represent the correction signal C(m), and the least significant 10 bits represent the correction signal D(m).

The memory I/F 177 separates the correction signal C(m) from the correction signal D(m) in the output signal of the memory 175. Thereafter, the memory I/F 177 supplies the correction signal C(m) to the multiplier 172 and supplies the correction signal D(m) to the adder 173.

The subtracter 171 subtracts the black level from the input (the output signal of the image sensor 101). The black level is supplied from, for example, a register (not shown). The multiplier 172 multiplies an output signal X(m, n) of the subtracter 171 by the correction signal C(m). The adder 173 adds the correction signal D(m) to the output signal of the multiplier 172. The adder 174 adds the black level to the output signal of the adder 173. Thus, an output is obtained.

An exemplary operation performed by the vertical streak noise removal circuit 110G shown in FIG. 14 is described next. In this example, the output signal of the CMOS image sensor 101 from an address (m, n) is input to the vertical streak noise removal circuit 110G.

In this case, correction signals C(m) and D(m) corresponding to the output system that outputs the output signal from the address (m, n) of the CMOS image sensor 101 are read out from the memory 175 under the control of the memory control unit 176. At that time, the memory I/F 177 supplies the correction signal C(m) to the multiplier 172, and supplies the correction signal D(m) to the adder 173.

In addition, the output signal from the address (m, n) of the CMOS image sensor 101 is input to the subtracter 171. Furthermore, the black level is supplied to the subtracter 171. The subtracter 171 subtracts the black level from the input. An output signal X(m, n) of the subtracter 171 is supplied to the multiplier 172. The multiplier 172 multiplies the signal X(m, n) by the correction signal C(m).

The output signal C(m)*X(m, n) of the multiplier 172 is supplied to the adder 173. The adder 173 adds the correction signal D(m) to the signal C(m)*X(m, n). The output signal Y(m, n)=C(m)*X(m, n)+D(m) of the adder 173 is supplied to the adder 174. In this case, even when the signal X(m, n) contains vertical streak noise, the signal Y(m, n) does not contain the vertical streak noise. The adder 174 adds the black level back to the signal Y(m, n). Thus, the output of the vertical streak noise removal circuit 110G can be obtained.

The vertical streak noise removal circuit 110G shown in FIG. 14 removes not only the offset component of the vertical streak noise generated by each of the output systems of the CMOS image sensor 101 but also vertical streak noise from the output signal of the CMOS image sensor 101 on the basis of the correction signals C(m) and D(m) corresponding to the light-intensity-dependent component. Accordingly, vertical streak noise (vertical streak fixed pattern noise) can be effectively removed.

In addition, the vertical streak noise removal circuit 110G shown in FIG. 14 removes vertical streak noise by subtracting the black level from the output signal of the CMOS image sensor 101, performing computation using the correction signals C(m) and D(m), and adding the black level back to the output signal. In this way, the vertical streak noise removal circuit 110G can sufficiently remove vertical streak noise without being influenced by the black level.

Although detailed description is not provided hereinafter, like the vertical streak noise removal circuit 110G shown in FIG. 14, even a vertical streak noise removal circuit that removes vertical streak noise using equation (2) can have one of the configurations of the vertical streak noise removal circuits 110B to 110F shown in FIGS. 9 to 13.

Figure 15:
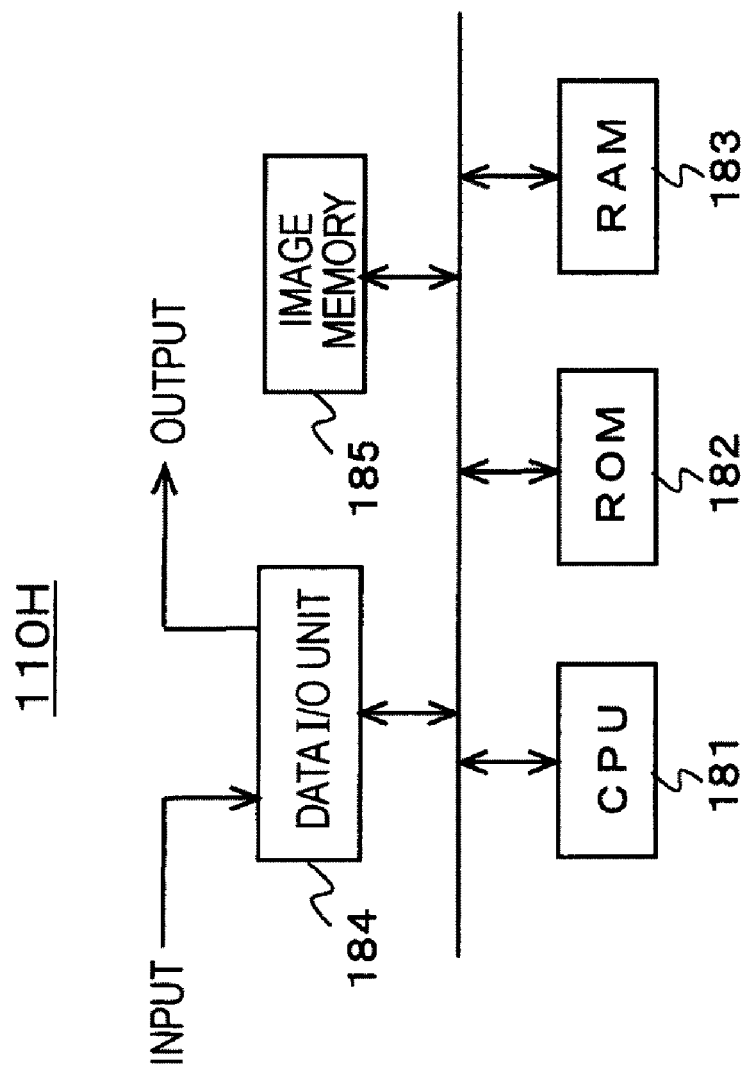
FIG. 15 is a block diagram illustrating an example configuration of a computer unit that performs a removal process of fixed pattern noise (vertical streak noise) through software.

While the foregoing embodiments have been described with reference to the vertical streak noise removal circuits 110A to 110G that remove vertical streak noise through hardware, the same processing can be provided through software. FIG. 15 illustrates an example configuration of a computer unit 110H that performs the processing through software. The computer unit 110H includes a central processing unit (CPU) 181, a read only memory (ROM) 182, a random access memory (RAM) 183, a data input and output (data I/O) unit 184, and an image memory 185.

The ROM 182 stores a processing program of the CPU 181, correction signals A(m) and B(m) (or correction signals C(m) and D(m)), and a plurality of correction coefficients P and Q corresponding to a variation in the property of the output system due to a temperature change, a variation in the gain of an amplifier included in the output system, and a variation in the operation of an image sensor due to the selection of an interlace driving method or a progressive driving method. The RAM 183 serves as a work area of the CPU 181. The CPU 181 reads out the processing program stored in the ROM 182 as needed. Thereafter, the CPU 181 transfers the readout processing program to the RAM 183 so that the processing program is loaded in the RAM 183. Subsequently, the CPU 181 performs a vertical streak removal process by reading the loaded program.

The output signal of the CMOS image sensor 101 is input to the computer unit 110H via the data I/O unit 184 and is stored in the image memory 185. The CPU 181 performs a vertical streak removal process on the signal output from the CMOS image sensor 101 and stored in the image memory 185. After the process is completed, the signal is externally output from the image memory 185 via the data I/O unit 184.

Figure 16:
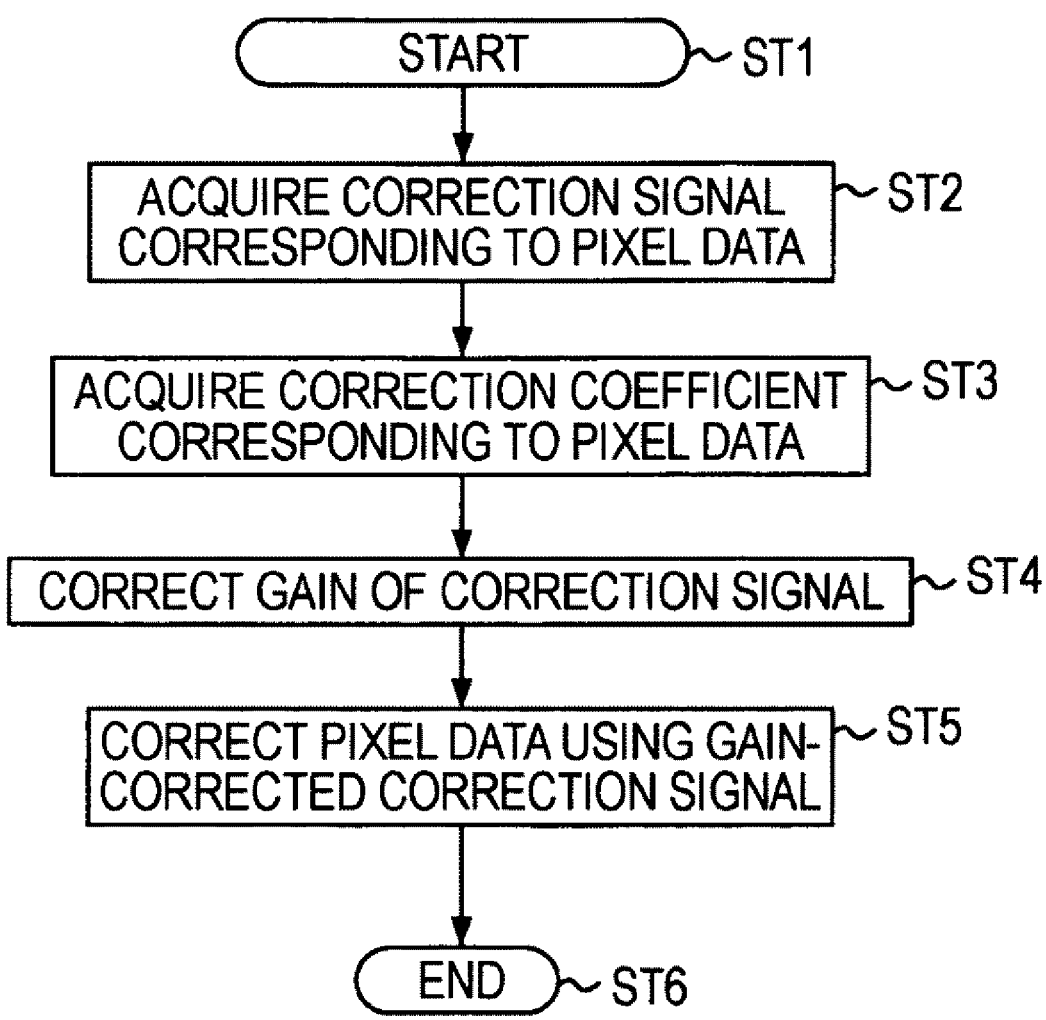
FIG. 16 is a flow chart of the vertical streak noise removal process performed by a CPU.

FIG. 16 is a flow chart of the vertical streak noise removal process performed by the CPU 181. Note that the flow chart corresponds to a process for one pixel data item. Accordingly, this process is sequentially performed for each of the pixel data items.

In step ST1, the CPU 181 starts processing and, subsequently, the process proceeds to step ST2. In step ST2, the CPU 181 acquires, from the ROM 182, correction signals A(m) and B(m) (or correction signals C(m) and D(m)) for a pixel data item to be processed, that is, for an output system of the CMOS image sensor 101 that outputs the pixel data item.

Subsequently, in step ST3, the CPU 181 acquires the correction coefficients P and Q for the pixel data item to be corrected from the ROM 182. In this case, the CPU 181 acquires appropriate correction coefficients P and Q while considering a variation in the property of the output system due to a temperature change, a variation in the gain of an amplifier included in the output system, and a variation in the operation of an image sensor due to the selection of an interlace driving method or a progressive driving method.

In step ST4, the CPU 181 corrects the gains of the correction signals A(m) and B(m) (or correction signals C(m) and D(m)) acquired in step ST2 using the correction coefficients acquired in step ST3. In step ST5, the CPU 181 corrects the pixel data item to be corrected using the correction signal having a gain corrected in step ST4. In step ST6, the CPU 181 completes the process.

While the foregoing exemplary embodiments of the present invention have been described with reference to an image pickup apparatus using a CMOS image sensor, the exemplary embodiments can be also applied to any image pickup apparatus including an image sensor having an output system for every several columns that generate vertical streak fixed pattern noise due to a variation in the properties of the output systems.

It should be understood by those skilled in the art that various modifications, combinations, sub-combinations and alterations may occur depending on design requirements and other factors insofar as they are within the scope of the appended claims or the equivalents thereof.

What is claimed is:

1. A fixed pattern noise removal circuit for removing vertical streak fixed pattern noise from an output signal of an image sensor including an output system for every predetermined number of columns, comprising:
    a correction signal output unit configured to output a correction signal corresponding to the output system in accordance with an offset component and a light-intensity-dependent component of the fixed pattern noise occurring in the output system; and
    a signal correction unit configured to remove the fixed pattern noise from the output signal of the image sensor on the basis of the correction signal output from the correction signal output unit,
    wherein the correction signal output unit includes a plurality of registers configured to output the correction signals corresponding to the output systems, a selector configured to selectively retrieve a predetermined correction signal from among the correction signals output from the registers, a memory configured to store an output selection signal corresponding to each of the output systems, and a memory control unit configured to read out, from the memory, an output selection signal corresponding to the output system that outputs an output signal of the image sensor on the basis of the synchronization signal that is synchronized with the output signal of the image sensor, and wherein the selector selectively retrieves the predetermined correction signal from among the correction signals output from the registers on the basis of the output selection signal read out from the memory.

2. The fixed pattern noise removal circuit according to claim 1, wherein the correction signal output unit outputs a first correction signal corresponding to the offset component and a second correction signal corresponding to the light-intensity-dependent component, and wherein the signal correction unit includes a subtracter configured to subtract a black level from the output signal of the image sensor, a first adder configured to add the first correction signal to an output signal of the subtracter, a multiplier configured to multiply an output signal of the first adder by the second correction signal, and a second adder configured to add the black level to an output signal of the multiplier.

3. A fixed pattern noise removal method for removing vertical streak fixed pattern noise from an output signal of an image sensor including an output system for a predetermined number of columns, comprising the steps of:
    acquiring, by use of a correction signal output unit, a correction signal corresponding to the output system in accordance with an offset component and a light-intensity-dependent component of the fixed pattern noise occurring in the output system; and
    removing the fixed pattern noise from the output signal of the image sensor on the basis of the correction signal retrieved in the step of acquiring a correction signal corresponding to the output system,
    wherein the correction signal output unit includes a plurality of registers configured to output the correction signals corresponding to the output systems, a selector configured to selectively retrieve a predetermined correction signal from among the correction signals output from the registers, a memory configured to store an output selection signal corresponding to each of the output systems, and a memory control unit configured to read out, from the memory, an output selection signal corresponding to the output system that outputs an output signal of the image sensor on the basis of the synchronization signal that is synchronized with the output signal of the image sensor, and wherein the selector selectively retrieves the predetermined correction signal from among the correction signals output from the registers on the basis of the output selection signal read out from the memory.

4. An image pickup apparatus comprising:
    an image sensor including an output system for every predetermined number of columns; and
    a fixed pattern noise removal circuit for removing vertical streak fixed pattern noise from an output signal of the image sensor;
    wherein the fixed pattern noise removal circuit includes a correction signal output unit configured to output a correction signal corresponding to the output system in accordance with an offset component and a light-intensity-dependent component of the fixed pattern noise occurring in the output system and a signal correction unit configured to remove the fixed pattern noise from the output signal of the image sensor on the basis of the correction signal output from the correction signal output unit, and
    wherein the correction signal output unit includes a plurality of registers configured to output the correction signals corresponding to the output systems, a selector configured to selectively retrieve a predetermined correction signal from among the correction signals output from the registers, a memory configured to store an output selection signal corresponding to each of the output systems, and a memory control unit configured to read out, from the memory, an output selection signal corresponding to the output system that outputs an output signal of the image sensor on the basis of the synchronization signal that is synchronized with the output signal of the image sensor, and wherein the selector selectively retrieves the predetermined correction signal from among the correction signals output from the registers on the basis of the output selection signal read out from the memory.

* * * * *